United States Patent
McLane

(10) Patent No.: US 12,446,779 B2
(45) Date of Patent: Oct. 21, 2025

(54) SYSTEMS AND METHODS OF MULTI-MODAL WEARABLE SENSOR FOR PATIENT MONITORING

(71) Applicant: PERIN HEALTH DEVICES LLC, Oklahoma City, OK (US)

(72) Inventor: Ian McLane, Bell Canyon, CA (US)

(73) Assignee: PERIN HEALTH DEVICES LLC, Oklahoma City, OK (US)

( * ) Notice: Subject to any disclaimer, the term of this patent is extended or adjusted under 35 U.S.C. 154(b) by 0 days.

(21) Appl. No.: 19/060,448

(22) Filed: Feb. 21, 2025

(65) Prior Publication Data

US 2025/0302388 A1 Oct. 2, 2025

Related U.S. Application Data

(60) Provisional application No. 63/573,306, filed on Apr. 2, 2024, provisional application No. 63/572,012, filed on Mar. 29, 2024.

(51) Int. Cl.
| | |
|---|---|
| A61B 5/00 | (2006.01) |
| A61B 5/01 | (2006.01) |
| A61B 5/0205 | (2006.01) |
| A61B 5/053 | (2021.01) |
| A61B 5/11 | (2006.01) |
| A61B 5/1455 | (2006.01) |

(Continued)

(52) U.S. Cl.
CPC ............. *A61B 5/7207* (2013.01); *A61B 5/01* (2013.01); *A61B 5/0205* (2013.01); *A61B 5/053* (2013.01); *A61B 5/1118* (2013.01); *A61B 5/14551* (2013.01); *A61B 5/318* (2021.01); *A61B 5/7264* (2013.01); *G16H 40/67* (2018.01); *A61B 2560/0209* (2013.01); *A61B 2560/0462* (2013.01); *A61B 2562/0219* (2013.01); *A61B 2562/0271* (2013.01)

(58) Field of Classification Search
CPC ................ A61B 5/7207; A61B 5/0205; A61B 2562/2019
See application file for complete search history.

(56) References Cited

U.S. PATENT DOCUMENTS

| | | | |
|---|---|---|---|
| 2013/0085538 A1* | 4/2013 | Volpe | A61B 5/1135 607/6 |
| 2016/0022220 A1* | 1/2016 | Lee | A61B 5/02433 600/479 |

(Continued)

*Primary Examiner* — James M Kish
*Assistant Examiner* — James Moss
(74) *Attorney, Agent, or Firm* — Command IP LLP; Pejman Yedidsion

(57) ABSTRACT

Systems, devices, and methods including a processor having addressable memory, where the processor is configured to: generate a series of recordings using a plurality of sensors via receiving a set of full measurements at a scheduled recording time; assign a priority to each of the recordings based on detection of abnormalities; determine a new recording schedule based on the generated series of recordings and detected abnormalities in the processed series of recordings; transmit the generated series of recordings and associated flag indicating whether an abnormality is present in the generated series of recordings; determine abnormal health patterns based on continuous monitoring capabilities; and provide an alert about the abnormal health patterns.

15 Claims, 12 Drawing Sheets

(51) Int. Cl.
    *A61B 5/318*     (2021.01)
    *G16H 40/67*     (2018.01)

(56) References Cited

U.S. PATENT DOCUMENTS

| | | | |
|---|---|---|---|
| 2016/0183813 A1* | 6/2016 | Naima | A61B 5/0537 |
| | | | 600/479 |
| 2018/0317789 A1* | 11/2018 | Ransbury | A61B 5/308 |
| 2019/0168071 A1* | 6/2019 | Franks | A61B 5/1072 |
| 2020/0321793 A1* | 10/2020 | Al-Ali | A61B 5/282 |
| 2021/0177290 A1* | 6/2021 | Jung | G06F 1/163 |
| 2023/0200668 A1* | 6/2023 | Reynolds | A61B 5/6898 |
| | | | 600/490 |

* cited by examiner

SYSTEMS AND METHODS OF MULTI-MODAL WEARABLE SENSOR FOR PATIENT MONITORING

CROSS-REFERENCE TO RELATED APPLICATIONS

This application claims priority to and the benefit of U.S. Provisional Patent Application No. 63/573,306, filed Apr. 2, 2024, and U.S. Provisional Patent Application No. 63/572,012, filed Mar. 29, 2024, the contents of which are hereby incorporated by reference herein for all purposes.

TECHNICAL FIELD

Embodiments generally relate to a wearable medical device that incorporates several physiological sensing modalities and, more particularly, to architecture including a secondary receiving unit, a cloud system, and a clinical dashboard to support the use of the wearable medical device.

BACKGROUND

Lung and heart diseases and illnesses pose serious threats to individuals and to the public. Collectively, respiratory and cardiovascular conditions, including ischemic heart disease, stroke, chronic obstructive pulmonary disease (COPD), and lower respiratory infections (LRIs), comprise the top four leading causes of death worldwide, as analyzed by The World Health Organization (WHO) in 2019. The over 21 million lives that are lost annually to these diseases could be reduced with improved monitoring solutions that alert at-risk patients to worsening symptoms and enable prompt treatment.

SUMMARY

A system embodiment is disclosed as comprising: a wearable device having a processor and an addressable memory and a plurality of sensors, where the plurality of sensors comprises an electrical and biopotential sensor, an optical module, an impedance matched acoustic module, a temperature sensor, and an inertial measurement unit (IMU); and a secondary receiving unit having a processor and an addressable memory. In one embodiment, the wearable device may be configured to: receive a request from the secondary receiving unit to generate a series of recordings using the plurality of sensors based on a customized recording schedule, where the series of recordings may be generated via taking a set of measurements; detect a current motion associated with a user of the wearable device for generation of the series of recordings based on detecting motion by the IMU configured to measure current motion levels and always be on even while other sensors of the plurality of sensors are asleep; delay generation of the series of recordings via taking the set of measurements for a period of time, if the detected current motion is determined to be above a threshold whole measure; execute generation of the series of recordings via taking the set of measurements, if the detected current motion is determined to be below the threshold whole measure; determine, during the execution of generation of the series of recordings via taking the set of measurements, whether any detected motion is above the threshold whole measure, where motion levels are detected and monitored continuously during the taking of the set of measurements; extend the recording length by a predetermined period of time above the threshold while motion is being detected to be above the threshold, thereby dynamically adapt recording lengths based on sensor readings and maintain data quality of the recordings; transmit, via an established connection to the secondary receiving unit, the generated series of recordings and a flag based on the extension of recording length to indicate one or more sections of a current measurement are tagged as sections of high motion; and receive from the secondary receiving unit a new recording schedule based on the flagged transmitted generated series of recordings.

The system embodiment may have the secondary receiving unit configured to: perform local processing on the received generated series of recordings and determine a new recording schedule based on the received flag. In one embodiment, the wearable device may be further configured to: detect an interruption to the established connection with the secondary receiving unit based on the secondary receiving unit not being present or the connection being lost; store the generated series of recordings on the addressable memory of the wearable device in a stack based on the detected interruption; and transmit to the secondary receiving unit at the next connection possibility a set of most recent recordings data first, followed by other measurements in reverse chronological order thereby prioritize the most recent recordings information that describes the current status of the patient.

In one embodiment, the wearable device may be further configured to: assign, via the stacking procedure, a priority to each recording of the generated series of recordings, where the most recent recording is assigned the highest priority and then descending priority by time stamp. In another embodiment the wearable device may be further configured to detect abnormalities in the recording via on-board algorithms; and assign the highest priority to a recording of the generated series of recordings regardless of timestamp based on the detected abnormalities. In one embodiment, the recordings with abnormalities may not be replaced by normal recordings if abnormalities are detected via the on-board algorithms.

The wearable device in one embodiment may be further configured to: adjust recording frequency based on whether any abnormal recording has been detected. In one embodiment, the wearable device may be further configured to: increase the recording frequency by a standard multiplier factor for a period of time or until abnormalities subside, whichever is first.

In one embodiment, the plurality of sensors may further comprise: sensing modalities of at least one of: impedance-matched auscultation, electrocardiography (ECG), pulse oximetry via photoplethysmography (PPG), bioimpedance (BioZ), skin temperature, and motion and tilt, where each sensor the plurality of sensors may be configured to make relevant measurements on an interval that is different from the other sensors.

A device embodiment having a processor and an addressable memory may comprise: a plurality of sensors, where the plurality of sensors comprises an electrical and biopotential sensor, an optical module, an impedance matched acoustic module, a temperature sensor, and an inertial measurement unit (IMU). In one embodiment the device may be configured to: receive a request to generate a series of recordings using the plurality of sensors based on a customized recording schedule, where the series of recordings may be generated via taking a set of measurements; detect a current motion associated with a user of the device for generation of the series of recordings based on detecting motion by the IMU configured to measure current motion levels and always be on even while other sensors of the plurality of sensors are asleep; delay generation of the series of recordings for a period of time, if the detected current motion may be determined to be above a threshold whole measure; execute generation of the series of recordings, if the detected current motion may be determined to be below the threshold whole measure; determine, during the execution of generation of the series of recordings, whether any detected motion may be above the threshold whole measure, where motion levels are detected and monitored continuously during the taking of the set of measurements; extend the recording length by a predetermined period of time above the threshold while motion may be being detected to be above the threshold, thereby dynamically adapt recording lengths based on sensor readings and maintain data quality of the recordings; transmit the generated series of recordings and a flag based on the extension of recording length to indicate one or more sections of a current measurement are tagged as sections of high motion; and determine a new recording schedule based on the flagged transmitted generated series of recordings and dynamically adapted recording lengths.

In one embodiment, the wearable device may be further configured to: assign a priority to each recording of the generated series of recordings, where the most recent recording may be assigned the highest priority and then descending priority by time stamp; detect abnormalities in the recording via on-board algorithms; assign the highest priority to a recording of the generated series of recordings regardless of timestamp based on the detected abnormalities, where recordings with abnormalities are not replaced by normal recordings if abnormalities are detected via the on-board algorithms; and adjust recording frequency based on whether any abnormal recording has been detected.

A method embodiment may comprise the steps of: receiving by a wearable device having a processor and an addressable memory a request from a secondary receiving unit having a processor and an addressable memory to generate a series of recordings using a plurality of sensors based on a customized recording schedule, where the series of recordings may be generated via taking a set of measurements; detecting a current motion associated with a user of the wearable device for generation of the series of recordings based on detecting current motion levels; delaying generation of the series of recordings for a period of time, if the detected current motion may be determined to be above a threshold whole measure; executing generation of the series of recordings if the detected current motion may be determined to be below the threshold whole measure; determining, during the execution of generation of the series of recordings whether any detected motion may be above the threshold whole measure, where motion levels are detected and monitored continuously during the taking of the set of measurements; extending the recording length by a predetermined period of time above the threshold while motion may be being detected to be above the threshold, thereby dynamically adapt recording lengths based on sensor readings and maintain data quality of the recordings; assigning a priority to each recording of the generated series of recordings, where the most recent recording may be assigned the highest priority and then descending priority by time stamp; detecting abnormalities in the recording by the wearable device.

In one embodiment, the method may also include assigning the highest priority to a recording of the generated series of recordings regardless of timestamp based on the detected abnormalities, where recordings with abnormalities are not replaced by normal recordings; adjusting recording frequency based on whether any abnormal recording has been detected; transmitting, to the secondary receiving unit, the generated series of recordings and a flag based on the extension of recording length to indicate one or more sections of a current measurement are tagged as sections of high motion; and receiving from the secondary receiving unit a new recording schedule based on the flagged transmitted generated series of recordings.

The method embodiment may further comprise the steps of: detecting an interruption to the established connection with the secondary receiving unit based on the secondary receiving unit not being present or the connection being lost; storing the generated series of recordings on the addressable memory of the wearable device in a stack based on the detected interruption; and transmitting to the secondary receiving unit at the next connection possibility a set of most recent recordings data first, followed by other measurements in reverse chronological order thereby prioritize the most recent recordings information that describes the current status of the patient, where the wearable device may comprise a plurality of sensors including: an electrical and biopotential sensor, an optical module, an impedance matched acoustic module, a temperature sensor, and an inertial measurement unit (IMU).

BRIEF DESCRIPTION OF THE DRAWINGS

The components in the figures are not necessarily to scale, emphasis instead being placed upon illustrating the principals of the invention. Like reference numerals designate corresponding parts throughout the different views. Embodiments are illustrated by way of example and not limitation in the figures of the accompanying drawings, in which.

DETAILED DESCRIPTION

Figure 1:
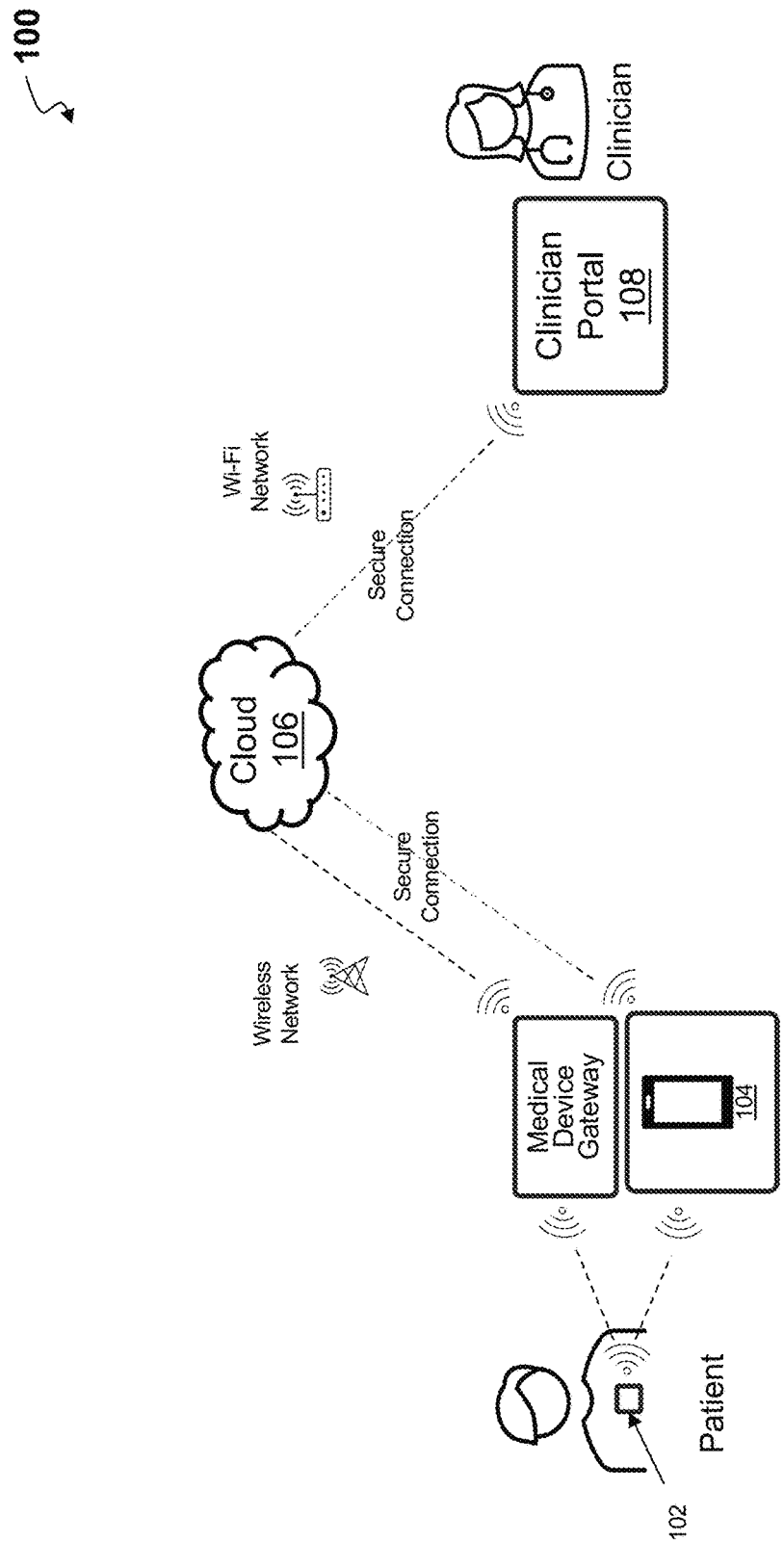
FIG. 1 depicts a high-level block diagram of the disclosed system and system architecture, according to one embodiment.

Remote patient monitoring (RPM) is an area of increasing interest within the healthcare industry for its potential to improve patient outcomes and decrease costs. In an RPM program, a patient's clinical monitoring moves from periodic to continuous sampling. The RPM programs enable key vitals to be monitored on a more regular basis, e.g. daily or even hourly, at home by the patient or with help from a relative, instead of weeks or months between visits or needing to move to a healthcare unit where a nurse collects measurements more sparsely. With more continuous sampling in natural contexts, the evolution of health conditions is better monitored, and the occurrence of other conditions may be predicted. These systems then allow for real-time alerting and communication channels to mitigate worsening symptoms or other risks. When used in these contexts, RPM solutions have been shown to improve the efficiency of diagnosis, the prevention of risk situations, the effectiveness of treatments, and the reduction of excess deaths.

Medical wearables have been introduced and adopted over the last few years to solve the issues associated with patient compliance and discrete data points. Wearables take many forms, including versions worn on the wrist, arm, and chest, and are configured to take more continuous measurements of vital signs. The disclosed embodiments provide systems and devices that may be configured to gather all five key vital signs for a patient-pulse rate, respiratory rate, oxygen saturation, temperature, blood pressure-resulting in minimizing interactions needed by the patient to remember to take measurements and reducing the risk of patient drop out.

High-quality acoustic monitoring in a wearable device is disclosed for use in continuous healthcare monitoring. Sounds from the body may be captured noninvasively where specific spectral and temporal features that are linked to health conditions may be utilized. The disclosed embodiments of the multi-modal wearable sensor and system may be paired with or configured to execute machine learning algorithms, thereby configured to provide interpretability and diagnosis of these sounds to make significant impacts on health outcomes, as acoustic features have been linked to heart failure hemodynamics, COPD severity, and airway obstruction level.

The present embodiments disclose a wearable health patch system configured to combine multiple sensing modalities for monitoring a person's physiological data in a single system: impedance-matched auscultation, electrocardiography pulse oximetry via photoplethysmography (PPG), bioimpedance (BioZ), skin temperature, and motion and tilt. The wearable system may be configured to take simultaneous measurements with precise timing alignment of all modalities. The combination of these modalities in a small, low-power wearable form allows for the continuous monitoring of primary vital signs (e.g., heart rate, respiratory rate, temperature, non-invasive blood pressure, oxygen saturation, lung and heart sounds) along with the possibility of collecting many other clinical measures, including cardiac output, atrial fibrillation, murmurs, crackles and wheezes, respiratory effort, fluid consolidation, cough counting, activity detection, posture, fall detection, and sleep apnea. Patients and clinical teams are alerted in near real-time through a computing system, for example, where the computing system may include multiple compute nodes, to abnormal health patterns that could indicate exacerbations of a health condition or high-risk, acute situations.

In one or more aspects, systems, devices, and methods comprising a computer processor having addressable memory are disclosed, where the computer processor may be configured to: generate a series of recordings using a plurality of sensors via receiving a set of full measurements at a scheduled recording time; perform local processing on the generated series of recordings based on detecting motions and abnormalities in the recordings; assign a priority to the recordings based on timeline of recording and presence of abnormalities; determine a set of measurement data and data points based on the processed series of recordings; transmit the set of measurement data and data points to an external computing device/system; adjust the recording schedule and determine abnormal health patterns based on continuous monitoring capabilities thereby alert the remote portal about the abnormal health patterns.

FIG. 1 depicts a high-level block diagram of the disclosed system and system architecture 100, according to one embodiment. Referring to FIG. 1, the system architecture 100 disclosed includes a wearable device 102 (e.g., chest-worn health patch), a secondary receiving unit 104 (e.g., a smartphone or a medical hub having a processor and addressable memory), a server computing system or a network computing system 106 (e.g., a cloud system having a network of computing devices), and a clinician portal 108. Measurements are taken by the wearable device 102 configured to take measurements and are processed and streamed wirelessly to the receiving unit. When the secondary receiving unit receives the full measurements, additional local processing may be executed before telemetering the measurements and data points to the cloud system over a wireless network (e.g., Wi-Fi or cellular connections), where the measurement data may be immediately available for viewing by the clinical team through their web-based clinician portal using a wired or wireless network (e.g., Wi-Fi). In one embodiment, the latency may be reduced by the use of this architecture where, in one example, there is less than an approximate 5-second latency between the completion of a measurement by the wearable device on the patient and the data being visible on the clinician portal. The transmissions of measurement data among the wearable device, the receiving unit, the cloud system, and the clinician portal may be performed via secure connections.

Figure 2:
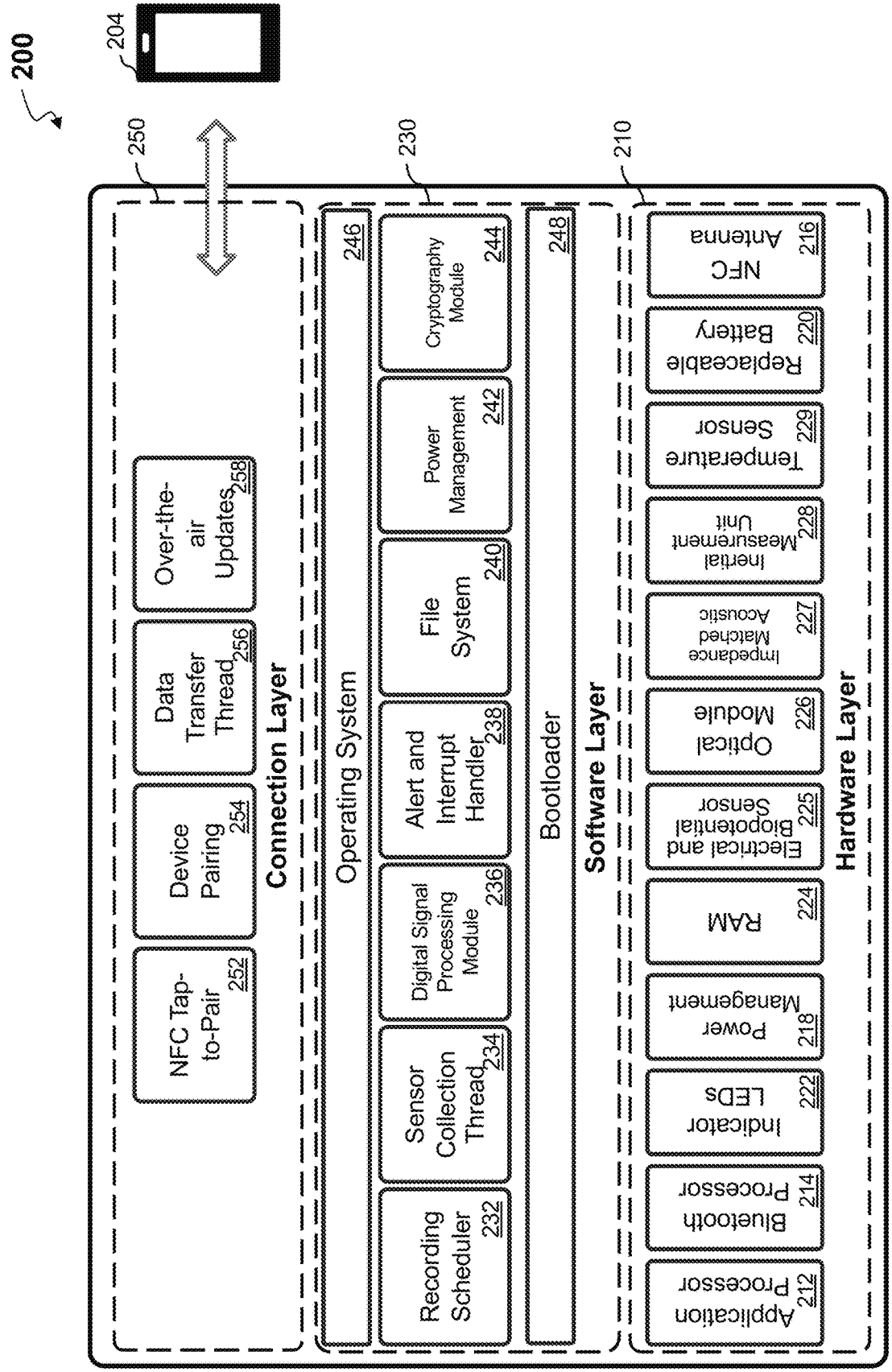
FIG. 2 depicts a high-level block diagram of a wearable device architecture of the disclosed system, according to one embodiment.

FIG. 2 depicts a high-level block diagram of a wearable device 200 architecture of the disclosed system, according to one embodiment. The disclosed wearable device 200 may be in communication with a user equipment device 204, e.g., a smartphone, and designed to be worn on the left anterior, right anterior, or axillary sides of the patient and, as another option, adhered to the chest with a long-term wear adhesive. The adhesive may be placed on the patient-facing side of the wearable device (e.g., chest-worn health patch), with cutouts for the sensors to make direct contact with the skin. The wearable device may be lightweight and semi-flexible, allowing for the device to conform to the natural curvature of the body, for example, the chest. The wearable device (e.g., wearable health patch) may be water resistant, allowing for bathing and normal activities while the patient is wearing the system. Therefore, the need for removing the system for bathing is eliminated, which introduces the risk that the patients will not replace the device immediately, resulting in gaps in the clinical data.

The wearable device may be shown with a hardware layer 210, a software layer 230, and a connection layer 250. The hardware layer 210 may include: an application processor 212, a Bluetooth processor 214, various sensors, a Near Field Communication (NFC) antenna 216, a power management 218, a replaceable battery 220, indicator LEDs 222, and a RAM 224. The various sensors may be devices that measure a variety of health signals of a patient and may include an electrical and biopotential sensor 225, an optical module 226, an impedance matched acoustic module 227, an inertial measurement unit 228, a temperature sensor 229, and others. In the software layer 230, the wearable device may include a recording scheduler 232, a sensor collection thread 234, a digital signal processing module 236, an alert and interrupt handler 238, a file system 240, a power management 242, a cryptography module 244, an operating system 246, and a bootloader 248. The connection layer 250 is configured to enable wireless connection. The connection layer 250 may include an NFC tap-to-pair module 252, a device pairing module 254, a data transfer thread module 256, and an over-the air updates module 258.

Figure 3:
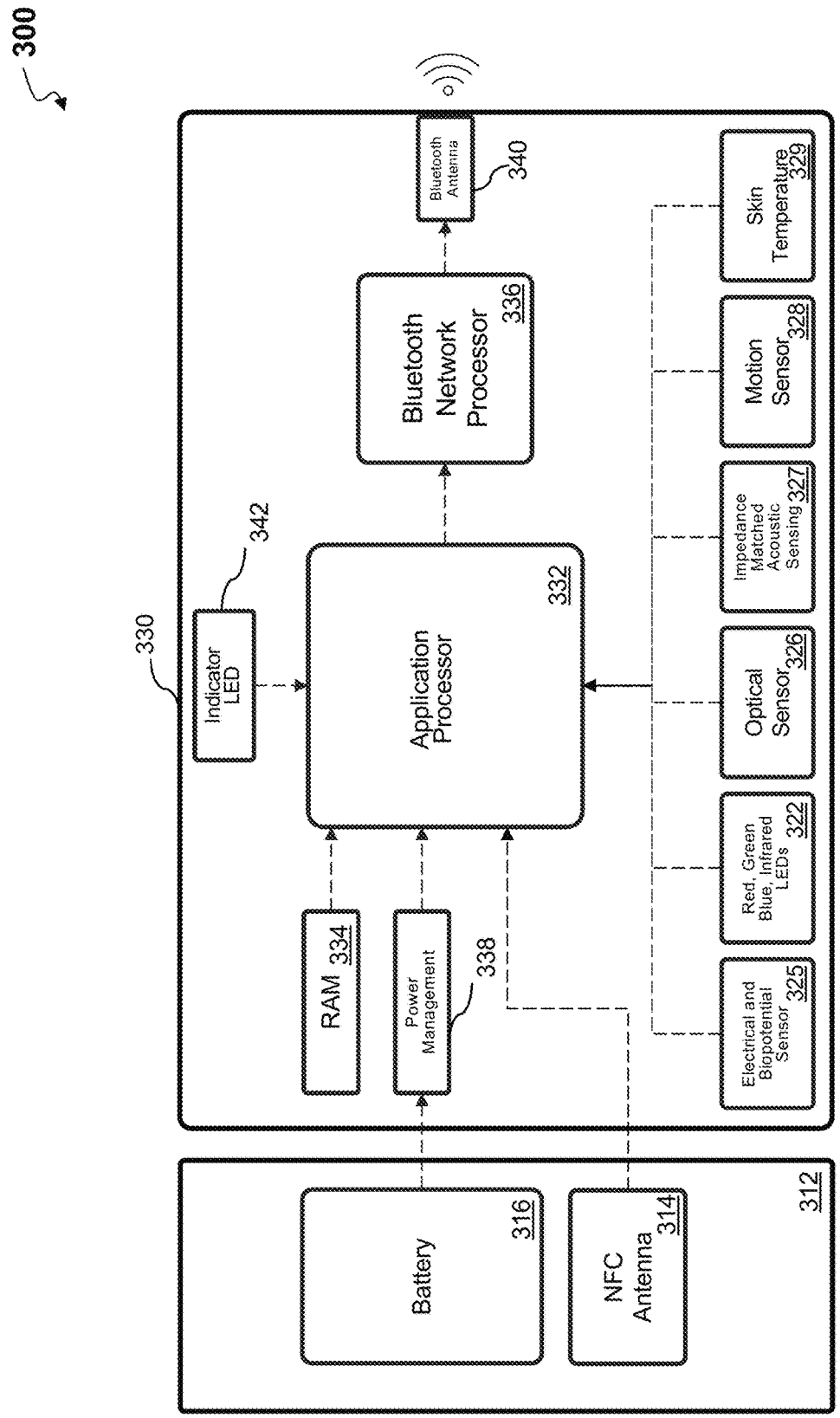
FIG. 3 depicts a high-level block diagram of a wearable device hardware architecture, according to one embodiment.

FIG. 3 depicts a high-level block diagram of a wearable device hardware architecture, according to one embodiment of the Hardware Layer show in FIG. 2, ref. no. 210. Referring to FIG. 3, the wearable device hardware 300 may comprise a battery pack 312, that may include a battery 316 and an NFC antenna 314, and core electronics 330, that may include a processor, e.g., an application processor 332, an addressable memory, e.g., a random-access memory (RAM) 334, a Bluetooth network processor 336, a power management 338, and various sensors. The set of sensors may include: an electrical and biopotential sensor 325, an optical sensor 326, an impedance matched acoustic sensor 327, a motion sensor 328, a skin temperature sensor 329, and others. The wearable device may further comprise a Bluetooth antenna 340, an indicator LED 342, and various LEDs 322, such as red, green, blue, and infrared LEDs. The wearable device may be configured to communicate and transmit data to the receiving unit via Bluetooth or other comparable transmission protocols. Measurements, bidirectional notifications and control commands, and software updates are transmitted over the aforementioned connection(s). In one embodiment, the wearable device may use NFC to facilitate the Bluetooth pairing process by using the NFC tap-to-pair and the device pairing configurations. For example, users may simply have to tap their smartphone (within two inches) to initiate a Bluetooth connection between their phone and the wearable device without performing a manual selection from settings or from a list of Bluetooth devices may be needed. Another embodiment of the wearable device may include an onboard memory that may store data spanning over a period of time, for example, over two weeks of data. When measurements are taken, and no receiving unit is present or the connection with the receiving unit is lost/interrupted, the wearable device may be configured to detect the interruption and then store recordings in the onboard memory. Recordings may be stored in a stack, such that at the next connection possibility between the wearable device and the receiving unit, the most recent data may be transmitted first, followed by other measurements in reverse chronological order. This is driven by the clinical need to prioritize the most recent information as it describes the patient's current status.

In one embodiment, when recordings are conducted, the stacking procedure assigns a priority to the recording, with the most recent recording assigned the highest priority and then descending priority by time stamp. If abnormalities are detected via on-board algorithms that are executed on a device to perform a specific task, for example, an abnormality detection algorithm, the recording may be assigned the highest priority regardless of timestamp. In one embodiment, the system may employ two types of abnormality detection algorithms. The first abnormality detection algorithm may be a binary machine-learning-based classifier that is trained on large patient datasets to detect the presence (or absence) of abnormalities such as atrial fibrillation, heart murmur, or wheezing. The second abnormality detection algorithm may be a comparison to the baseline for objective clinical measures, such as heart rate, heart rate variability, respiratory rate, etc. The patient baseline may be determined by the system at the time of discharge, during enrollment by the clinical team, and/or patient-specific thresholds may be set by the clinical team to alert for abnormalities. If multiple recordings contain abnormalities from on-board algorithms, the system is configured to also rank the recordings based on most recent to least recent but give higher priorities than all abnormal recordings. Once reconnected, recordings are transferred to the secondary receiving unit based on the established priority list. If the memory runs out, recordings are replaced based on the priority list: lowest priority recordings are replaced first. In one or more embodiments, abnormal recordings may not be replaced by normal recordings in this process, as abnormal recordings are the most clinically relevant.

In one embodiment, the system may switch to recording less often if it determines that the battery is running low. That is, when the battery is low (e.g., less than 10%), the system may be configured to (1) reduce the frequency of recordings and (2) reduce the number of modalities taken in a single measurement to conserve power. For example, heart sound measurements are more power intensive than ECG data, so heart sound recordings may not be collected in favor of ECG data to extend the battery life.

In another embodiment, the system may be configured to adjust the recording frequency based on whether any abnormal recording has been detected. That is, the 'dynamic recording schedule' (further discussed herein) may be used if abnormalities are detected, where the device may increase the recording frequency to get more granular information during the times of abnormalities. When abnormalities are no longer detected, the system may then return to the standard recording schedule set by the clinician.

The embodiments utilizing Bluetooth technology, for example, may also allow for 'over-the-air' software updates. As new updates are available for the wearable device, including bug fixes, security patches, or feature additions and improvements, the wearable device is configured to be updated via Bluetooth. The receiving unit may be notified via the server computing system (e.g., a network of computing devices, also referred to as the cloud system), that a new software update is available and should be pushed to the wearable device. That is, the receiving unit may receive a notification through execution of a software process via the network of computing devices. At the next connection between the wearable device and the receiving unit, the software update is loaded into the secure memory sector where the software update is validated. At the next step, the wearable device begins the installation process, which involves the bootloader installing the proper application software. If successful, the wearable device will restart automatically with the latest software updates. If unsuccessfully installed, the wearable device will revert back to the previous software version to reduce any risks of bricking the wearable device while out in the field, for example, on a patient. In one embodiment, the wearable device uses a process called a 'dual-bank update', where the received software update is stored in free memory and then copied to the intended memory location during activation. To safely perform an update, the new firmware image may not be copied to the final location in memory until it has been validated, including calculating checksums and checking code signatures to confirm the source of the update. This ensures that only complete and valid images are activated. If, for example, an error occurs during the transfer, the firmware will not be updated. This method ensures that the wearable device is configured to revert to the current application until the new firmware is verified, activated, and properly installed. In one embodiment, the system determines the timing of the update by waiting until motion is not detected for a predetermined amount of time which may signal, for example, a time where the system detects the user to be asleep.

Figure 4:
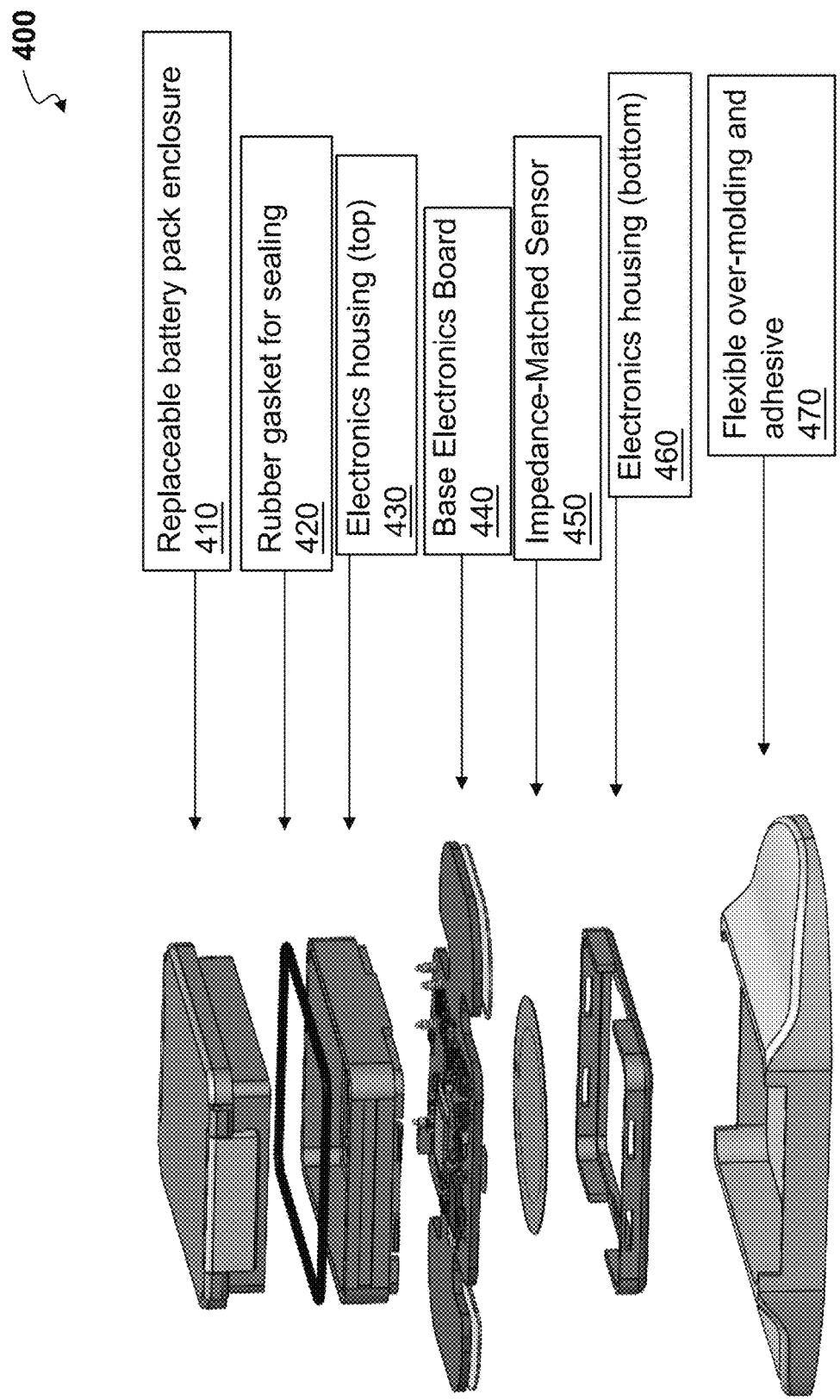
FIG. 4 depicts a diagram of a wearable device structure with a replacement battery, according to one embodiment.

FIG. 4 depicts a diagram of a wearable device structure with a replacement battery, according to one embodiment. Referring to FIG. 4, the embodiments of the wearable device 400 may be battery-powered by a high-capacity disposable thin film battery, for example, with a 14-day battery life when used for continuous monitoring and up to 100-day battery life when used for measurements every 30 minutes. Referring to FIGS. 3 and 4, the wearable device includes two separate parts: a base electronics board with all the core electronics, sensing, and communication components, and a battery pack attachment that includes the battery and NFC antenna. The battery pack is designed to be removable and Snap-On, such that the battery pack is configured to be easily removed and replaced without impacting the core electronics and while maintaining the water resistance feature of the wearable device.

The wearable device 400 may include a replaceable battery pack enclosure 410, a rubber gasket for sealing 420, a top portion of an electronics housing 430, a base electronics board 440, an impedance matched acoustic sensor 450, a bottom portion of an electronics housing 460, and a flexible over molding and adhesive 470. The base electronics board 440 may have a rigid flex printed circuit board with sensors and electrodes included.

The use of a replaceable battery pack is based on several clinical, usability, and operational requirements. In the inpatient setting, where patients are being monitored during hospitalizations, clinicians need to be able to quickly replace batteries without significant interruptions in the clinical data stream and without dramatically impacting their standard clinical practice and workflow. Similarly, in the home health scenario, the device allows patients to easily and quickly replace batteries for the wearable device without needing to remove the wearable device from their chest, as is needed for rechargeable or single-use wearable devices. Wearable devices with rechargeable batteries, such as wrist-, arm-, or chest-worn wearable devices, have been shown to only have an average of approximately 8.6 to 10.5 daily streaming hours in a 24-hour period, with sharp drops in the late evening hours after 8 pm lasting until 10 am, as patients place wearable devices to charge prior to sleep and reapply the device upon wakeup. The ability to quickly replace the battery while the wearable device (e.g., patch) remains adhered to the chest of the patient decreases the risk that wearable devices are not reapplied in a timely manner, and improves the continuity of data collection, especially during critical periods like the nighttime.

A replaceable battery may be used in some embodiments, while the single-use battery pack may be disposed of while the base board of electronics and sensors can be reused multiple times by a single patient and then returned to the manufacturer for recycling or sanitization and reuse. Optionally, to further reduce electronic waste, the battery in the battery pack may be designed to be rechargeable. In this instance, users may be provided with two or more battery packs. As one battery pack is in use, the other may be charged. This allows for the batteries to still be quickly replaced but recharged rather than disposed of.

One of the disclosed embodiments of the wearable device (e.g., health patch) includes a number of sensing modalities and the integration of noise-robust auscultation. The wearable device may be configured to integrate an impedance-matched acoustic sensor that uses a passive noise cancellation technique via the incorporation of an acoustic impedance-matched diaphragm on a contact acoustic sensor. That is, an impedance matched sensor provides high sensitivity to body sounds, low sensitivity to airborne sound, and the ability to capture lung and heart sounds from a patient. The characteristic impedance of a material determines how sound pressure travels through the material and, more specifically, how sound is transmitted and reflected at the interface of two materials with two different impedances. By including an impedance matched layer over the acoustic sensor that is designed to match the impedance of the human body, heart and lung sounds are completely transmitted to the acoustic sensor, which is in direct contact with the body, rather than reflecting at the skin-air and then air-sensor interfaces. Conversely, because the impedance layer is significantly mismatched with air, airborne sounds and ambient noises are almost entirely reflected. That is, in one embodiment, ambient noise power is 'bounced back' at the impedance interface and is therefore not transmitted to the acoustic sensor as interference. With this physics-based approach, the acoustic sensor is configured to capture clean sounds from the lungs and heart without advanced processing needed.

Figure 5:
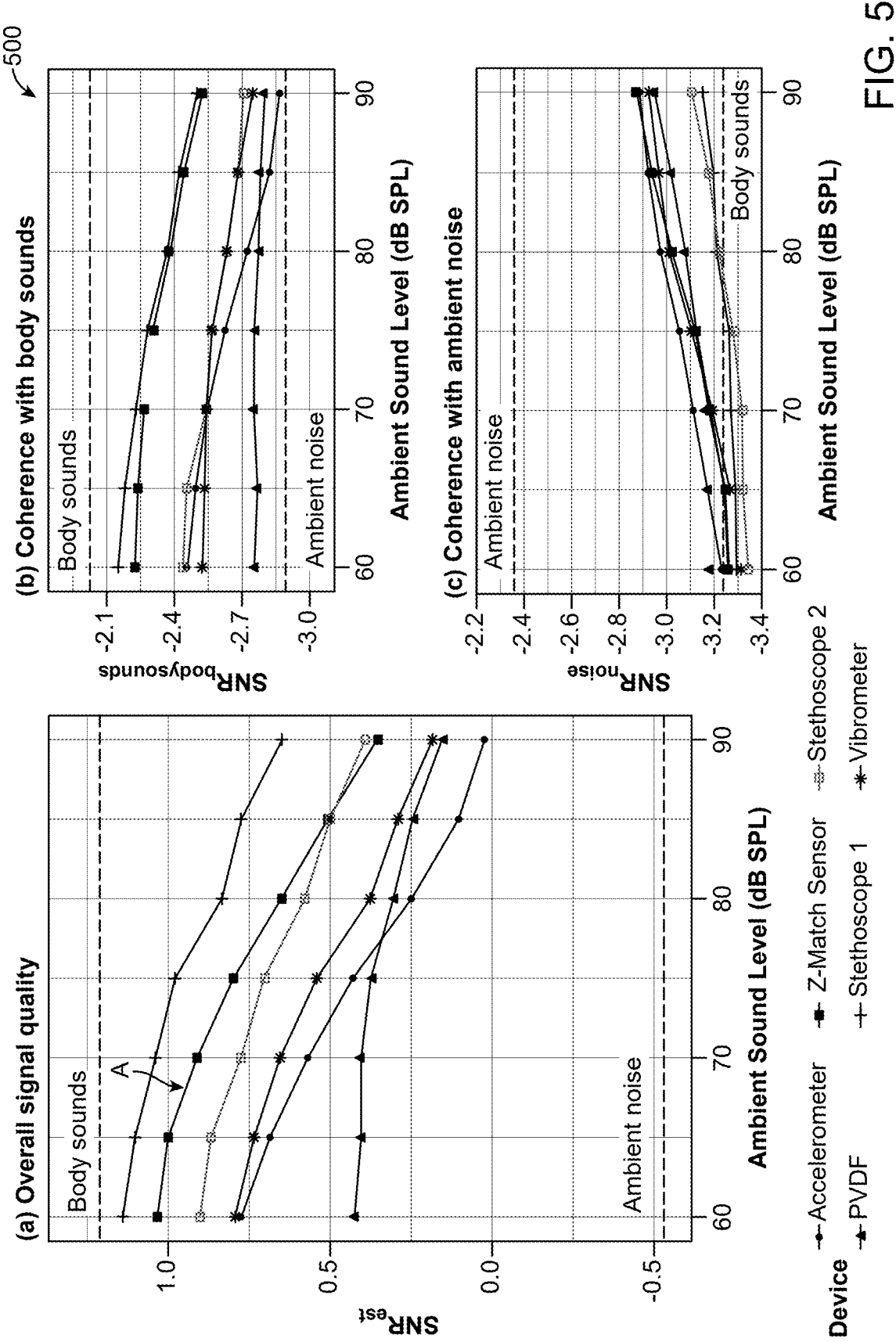
FIG. 5 depicts a graphical representation of the performance of the system across various ambient noises, according to one embodiment.

FIG. 5 depicts a graphical representation of the performance of the wearable device across various ambient noises, according to one embodiment. The wearable device 500 of the present disclosure exhibits a large bandwidth that captures the full frequency range of body sounds (e.g., 1 Hz to 2 kHz) and exhibits improved acoustic performance over other auscultation systems and sensor types in real-world environments. The overall signal quality (depicted in FIG. 5(*a*)) illustrates the performance of the system (Z-Match Sensor indicated by line A) across various ambient noise levels, with 60 dB SPL comparable to a quiet office setting and 90 dB SPL comparable to a loud subway station. In this figure, it is clear that the impedance-matched sensor of the present disclosure outperforms other systems by maintaining a very high coherence (similarity) to body sounds being picked up (FIG. 5(*b*)) and simultaneously a comparable noise rejection to systems that require active filtering while only requiring passive use (FIG. 5(*c*)). The acoustic sensor is also self-powered, allowing battery power to be allocated to four additional sensors without sacrificing its wearability or requiring frequent charging.

Referring to FIGS. 2 and 3 again, the wearable device (e.g., health patch) may include an electrical and biopotential sensor module, which is used to measure electrocardiogram (ECG) and bioimpedance (BioZ). The ECG may be used to measure the active response (e.g., when the body provokes electricity) of the heart. In one embodiment, silver electrodes or stainless steel electrodes of the ECG are placed on the chest, and the device measures natural electrical impulses that coordinate contractions of the heart to keep blood flowing. ECGs may be used to determine pulse rate, the steady or irregular rhythm of the heartbeat, and the strength and timing of electrical impulses as they move through the heart. Changes in these parameters and the ECG traces are directly correlated to heart-related conditions. The ECG module in the wearable device has electromagnetic interference (EMI) filtering, high-input impedance, low noise, high common mode rejection ratio (CMRR), and programmable gain. It is designed to meet, for example, IEC 60601-2-47 Ambulatory ECG Systems monitoring compliance requirements. The module also allows for lead-off detection and other configurable alerts, which may be configured to send an interrupt to the application processor to notify the software systems when the wearable device is off the body or not adhered properly. Machine learning analysis of the ECG signals may provide several key clinical measures, the details of which are outside the scope of this disclosure, but critically inform the design. The ECG alone allows for the detection of clinical markers such as atrial fibrillation, analysis of the P waves and the Q wave, R wave, and S wave (QRS) complex, but simultaneous measurement of ECG with auscultation allows for the gating of the acoustic signal by the ECG signal, and subsequent analysis of S3 heart sounds for an estimate of pulmonary artery hypertension and left ventricular ejection fraction (LVEF). The calculations of these measures are made via simultaneous measurements of the set of disclosed sensing modalities that are synchronized to the millisecond.

The electrical and biopotential sensor module of the wearable device may also be a measuring component to measure induced electrical activity—e.g., when tissues are stimulated through an external source. The measuring component may operate by applying an alternating, high frequency (16 Hz to 800 kHz) and small current (1 to 5 mA) to the body and measuring the electrical voltage difference. The acquired voltage is then proportional to the impedance variation of the local region under which the wearable device is placed. In one embodiment, the local region refers to the region that is within a threshold distance (e.g., 10 cm) to the wearable device. By utilizing higher frequency stimuli above 100 kHz, deeper penetration of the signals into inner tissues is possible, allowing for the relative measurement of respiration (impedance is proportional to air in the body) and extracellular and intracellular fluid levels (impedance is inversely proportional to fluid levels in the body). These measures are shown to be useful for guiding, for example, heart failure treatment in patients with ST-elevation myocardial infarction and improving outcomes in outpatients with heart failure. The measuring component also has high input impedance, low noise, programmable gain, and customizable input stimuli. The disclosed measuring component is intended for bioimpedance (BioZ) analysis of functional organs rather than skin impedance or electrodermal activity.

The wearable device embodiment may also include an optical module, or optical sensor, which is used to measure reflective photoplethysmography (PPG), a non-invasive technique used to calculate pulse oximetry waveforms and oxygen saturation values. The PPG employs absorption, scattering, and transmission/reflective properties of oxygenated and deoxygenated blood at specific wavelengths. Light emitting diodes (LEDs) emit light at a red wavelength of approximately 640 to 660 nm, an infrared wavelength of approximately 888 to 940 nm, and a broad-spectrum photodetector that detects the scattered light intensity after irradiation of the skin. Time-series waveforms of the scattered light intensity provide pulse rate, and the ratios of red and infrared light provide oxygen saturation. The wearable device also employs the use of a green LED (approximately 525 nm) to measure pulse traces. A green LED may be included in this wearable device because it has been shown that green light PPG can detect pulse rate with a high degree of accuracy. The optical module may also include ambient light cancellation, which cancels up to approximately 200 µA of DC photodiode current from ambient light hitting the photodetector, followed by a central difference method to remove any drift or residual. For the central difference method, ambient samples are taken before and after a driven (exposed) sample for each LED, and their meaning is removed from the driven sample. Simultaneous measurement of pulse oximetry and ECG-gated heart sounds (requiring three sensing modalities) allows for a more precise calculation of pulse transit time (PTT) than existing systems, which provides an indirect estimate of non-invasive blood pressure. In one embodiment, the wearable device is configured to use the three modalities to calculate this metric, using hardware to capture these simultaneous measures.

In one embodiment of the disclosed wearable device having the optical module, an additional blue LED with approximately 475 nm wavelength may be included. The combination of the red, green, and blue LEDs is used to determine skin-tone-adjusted calibration coefficients. Traditional pulse oximetry measurements utilize a polynomial fit to transform from time series data to oxygen saturation values, and the coefficients of the fit are used as calibration coefficients for systems. By including a blue LED, the wearable device is configured to estimate skin tone from the relative ratios of R/G/B absorption coefficients and make adjustments to the coefficients of the polynomial fit function. In one embodiment, the adjustment calculations are configured to be done in the on-board processing of the wearable device: best-fit coefficients are stored in the protected memory in the device, and deltas on these coefficients are estimated by the algorithm and applied to these coefficients in real-time to provide an adjusted estimate of oxygen saturation.

The wearable device embodiment may also include a skin temperature sensor. Surface body temperature is measured using a direct contact method on the skin by the skin temperature sensor. In some embodiments of the skin temperature sensor, a clinical-grade temperature sensor with an accuracy within approximately 0.1° C., which measures the temperature of a gold contact point that is in direct contact with the skin, is utilized. The sensor also measures the internal thermal temperature of the electronics. To reduce internal noise distribution, for example, 8-sample averages of the measurements are used. This surface body temperature provides a proxy for core body temperature but may be affected by external factors like the environment or electronics/sensor temperatures. The system transforms the surface temperature and sensor temperature measurements to an estimate of core body temperature using an extremely lightweight three-layer neural network that may be configured to run in real-time on the wearable device and model the nonlinear relationship between the two and take into account self-heating effects from the internal electronics, measured by chip-level sensors. In doing so, the average error of the core body temperature estimation is less than approximately 0.1505° C., well below the 0.5° C. requirement for clinical thermometers. The wearable device is designed to meet, for example, ISO 80601-2-56 Clinical thermometers compliance requirements. The temperature sensor may also be configured to trigger interrupts to the application processor when measured temperatures exceed lower and upper limit thresholds, allowing for real-time notifications of the temperature.

The wearable device may also include a motion sensor. Specifically, the motion sensor may be an inertial-based measurement unit from a triaxial accelerometer. The accelerometer is an ultra-low-power, always-on system that measures acceleration in terms of Earth's gravity "g" force. The three-axis measurement may be used to measure motion, tilt, and the six-dimensional position in space, which can then be incorporated into clinical measures. Most directly, daily activity detection—sitting, laying down, walking, climbing stairs, or running—is possible from the device. Activity detection is important for understanding variations in clinical data, like heart rate, respiratory rate, and oxygen saturation. For example, as pulse and respiratory rates increase faster with comparable activities, the patient is at higher risk of an acute event. Posture is also a critical clinical consideration: it has been known for decades that posture impacts auscultatory sounds for both the lung and the heart. For heart sounds, patients may not exhibit a murmur until they are in a sitting position. For the lung, posture can impact breath sound intensity, which can influence clinical interpretation. When conducting remote auscultation, automatically determining the activity and the posture of the patient may be necessary in order to contextualize the sounds that are being captured. When used in conjunction with other sensing modalities like lung auscultation, the wearable motion sensor has also been shown to provide very high correlations with inspiratory-expiratory flow rates and respiratory effort.

Figure 6:
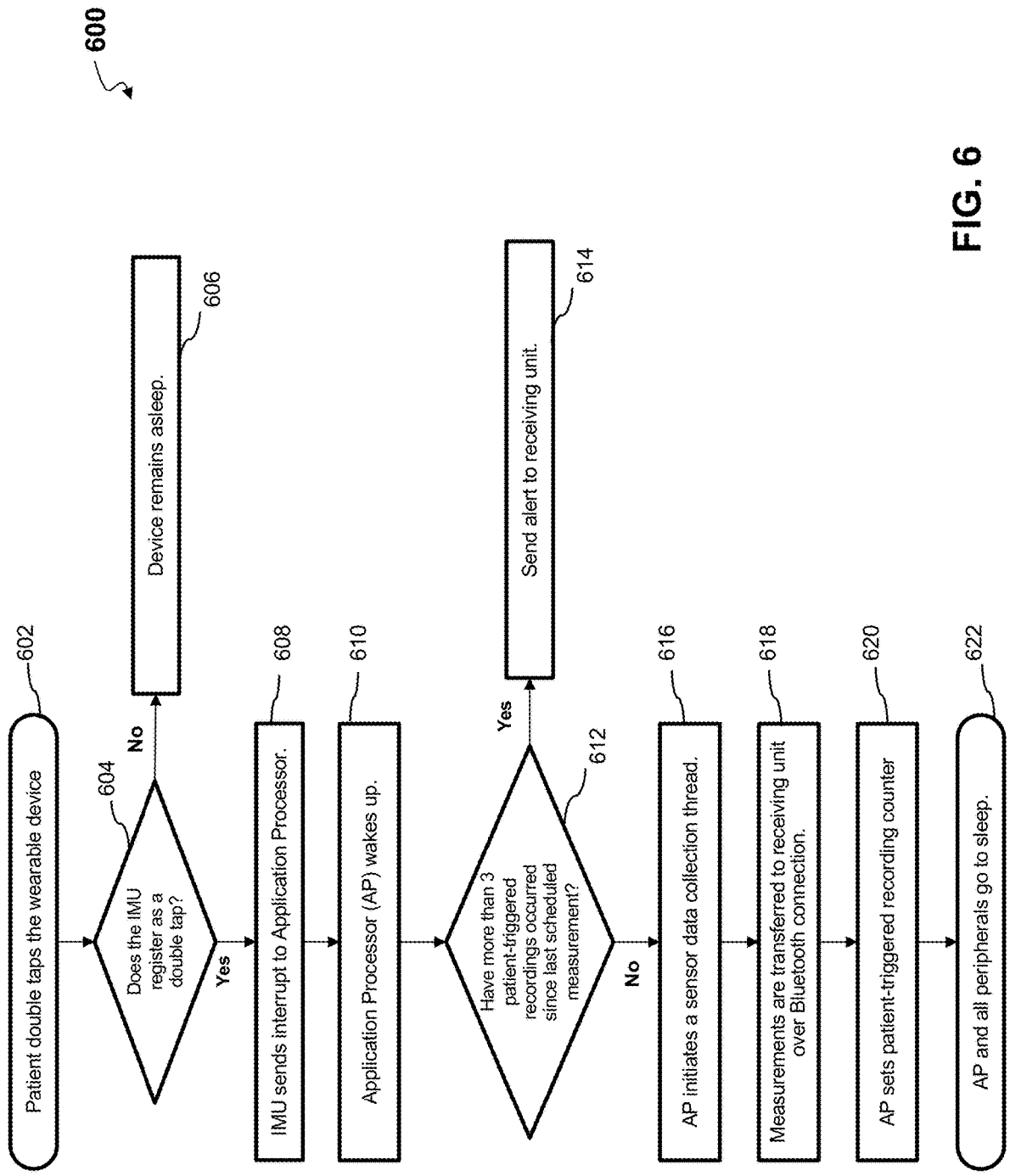
FIG. 6 depicts the generation of a patient-triggered recording logic, according to one embodiment.

FIG. 6 depicts the generation of a patient-triggered recording logic, according to one embodiment. In one embodiment of the disclosed wearable device—since the motion sensor is always on even when all other sensing and electronic components are asleep due to its ultra-low power consumption—the wearable device may be configured to generate interrupt signals that wake the system by detecting abnormal inertial wake-up and free-fall events. The wearable device may be configured to generate two interrupt signals. The first is the detection of falls, which represents a significant threat to the health and independence of adults 65 years of age and older. The system is woken up by the fall detection interrupt, which may be configured to send an alarm to the receiving unit to notify clinical personnel and family members. This feature reduces the time after a fall and before discovery/detection of the event. The second interrupt may be generated by the user, for example, by double tapping on the surface of the wearable device to wake up the system and initiate a measurement of all modalities. This feature allows patients to trigger recordings when they feel changes in their symptoms or to trigger a recording outside of the normal recording schedule. The measurements may then be tagged in the file metadata based on the triggered event, and the user is able to include a description of their symptoms in the mobile application to provide to the clinical team.

Specifically, the patient-triggered recording logic 600, according to one embodiment, may be processed as follows. When a patient double taps the wearable device (step 602), the wearable device determines if the inertial measurement unit (IMU) registers a double tap (step 604). If not, the wearable device remains asleep (step 606). If the double tap is registered, the inertial measurement unit sends an interrupt to the application processor (AP) (step 608), and the application processor wakes up (step 610). Then, the application processor determines the number of patient-triggered recordings above a predetermined threshold, for example, if there are more than 3 patient-triggered recordings having occurred since the last scheduled measurement (step 612). If so, the wearable device transmits an alert to the receiving unit (step 614). If determined that fewer triggers than a threshold have occurred, for example, 3 patient-triggered recordings, the application processor may initiate a sensor data collection thread (step 616), and then, measurements are transferred to the receiving unit over the Bluetooth connection (step 618). The application processor may also set a patient-triggered recording counter (step 620), after which point the application processor and all peripherals may go to sleep (step 622).

The inclusion of the motion sensor also allows for on-board quality control of measurements due to motion artifacts. Motion artifacts are significant in sensitive medical data collection: mechanical or motion artifacts are usually generated when the patient moves significantly while the wearable device is conducting a recording and can produce short-time broadband energy bursts. In ECG, PPG, or auscultation recordings, these energy bursts can mask the clinical signal or contribute to the misclassification of abnormalities. For example, in lung sounds, crackles are key abnormalities that are listened for, but share many of the same spectral features as motion artifacts; without the context from auscultating the patient directly, these sounds could result in the misclassification of crackles in patients. Though motion can be controlled in a clinical environment, motion is significantly more likely in natural contexts and in remote monitoring, thereby understanding and determining the timing of motion is key to high quality data in RPM programs.

Figure 7:
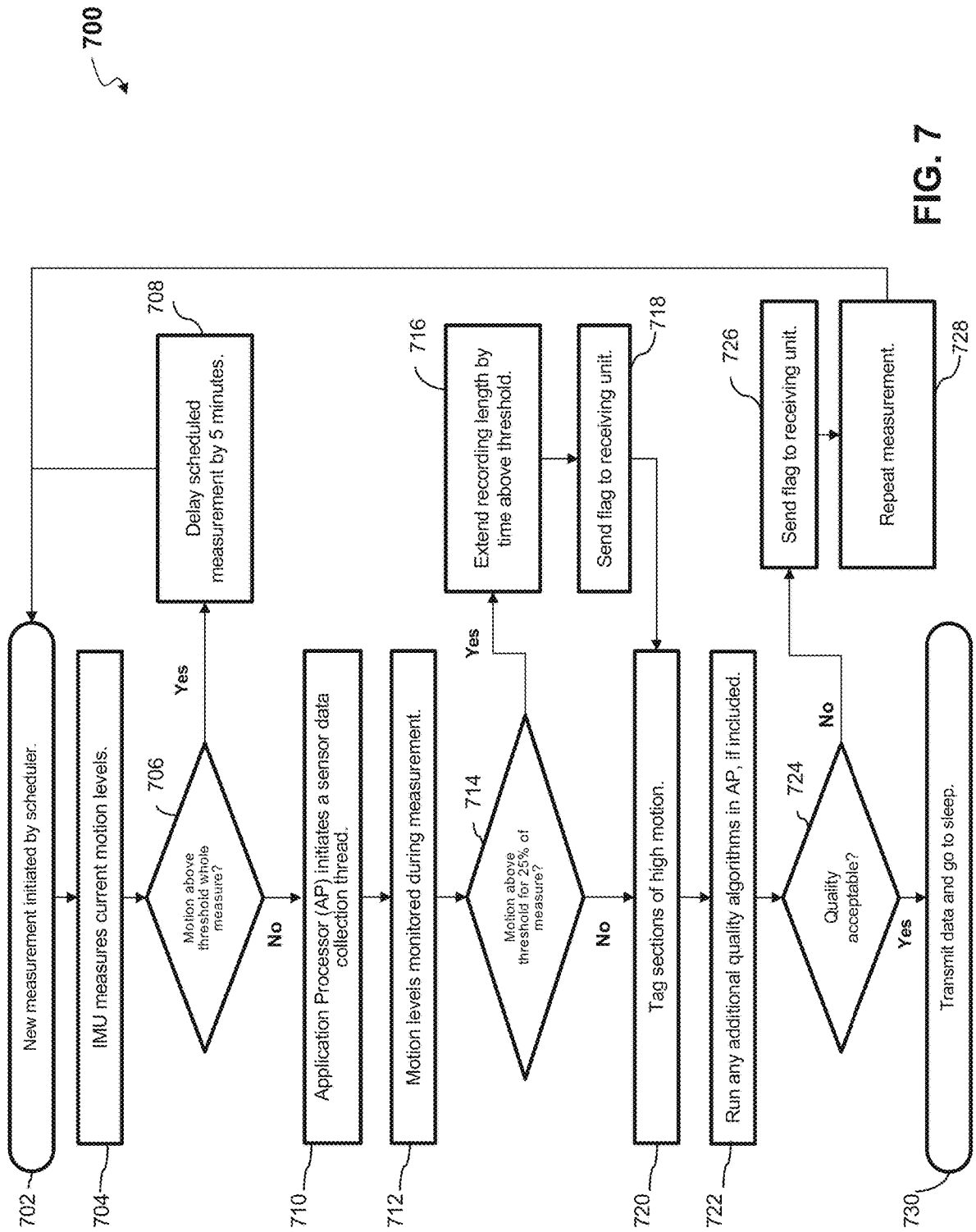
FIG. 7 depicts a flow diagram of a data quality process execution, according to one embodiment.

FIG. 7 depicts a flow diagram of a data quality process execution 700, according to one embodiment. The system undergoes several steps to measure the motion during a measurement and maintain the quality of the recordings. To summarize, in one embodiment, the motion sensor conducts recordings before clinical measurements are taken and may delay measurements if too much motion is detected, where too much motion may be determined via comparing the current motion to prior recordings, comparing to a threshold, etc.; sections of the measurements are tagged when motion is high (compared to a predetermined threshold) so that filtering and processing may be concentrated on specific sections of the measurement; and the measurement length may be dynamically adapted to take longer recordings if too many data packets are noisy, where too much data being noisy may be determined via comparing to prior recording data, comparing to a threshold, etc. Thereby, the disclosed system may be configured to dynamically adapt recording lengths based on sensor readings or other factors as described.

The wearable device may employ software components that improve clinical utility and patient usability, many of which were previously discussed. One embodiment of the wearable device discloses the ability to implement customized recording schedules as opposed to continuous measurements or having a single recording frequency (e.g., once an hour). In the disclosed embodiments, as the needs of patients differ, so do the frequency at which modalities are configured to be recorded. For example, when the clinician is enrolling a patient, the cloud system provides a recommended recording schedule based on a standard for the patient's diagnosis and clinical history, which the clinician may then customize for that patient in the clinical portal. Once the wearable device is set up for the patient, the custom recording schedule is loaded onto the wearable device. During monitoring, the wearable device sleeps and wakes to take measurements at the prescribed recording schedule. The embodiments of the recording schedule disclose that each modality/clinical measure may follow its own recording schedule. For example, ECG and PPG may be taken periodically, for example, every 10 minutes, but auscultation may be taken less often, for example, only every 60 minutes. If the clinician chooses a schedule for a clinical measure that requires multiple sensing modalities, such as pulse transit time for non-invasive blood pressure every 30 minutes, they may then all be turned on at that interval in addition to their own recording interval. That is, at any time interval or specific time t, each sensor may be configured to wake up and collect sensor data based on the modality and data being collected.

Specifically, referring to FIG. 7, the data quality process execution 700 according to one embodiment may be processed as follows. In one embodiment, a new measurement is initiated by the scheduler, which may have been loaded onto the wearable device (step 702), followed by the inertial measurement unit (IMU) being configured to measure current motion levels (step 704). Subsequently, the wearable device may be configured to determine if the measured motion is above the threshold whole measure (step 706), and if it is, the scheduled measurement may be delayed by a period of time, for example, 5 minutes (step 708). If the measured motion is below the threshold, the application processor (AP) initiates a sensor data collection thread (step 710), and motion levels are monitored during the measurement (step 712). The application processor may then determine if the measured motion is above the threshold, for example, for 25% of the measurement length (step 714). If it is, the recording length is extended by the time above the threshold (step 716), and the application processor transmits a flag to the receiving unit (step 718). Meanwhile, regardless of whether or not the measured motion is above the threshold for 25% of the measured motion, that measurement or sections of measurement is/are tagged as sections of high motions (step 720). In one embodiment where any additional quality algorithms are included/implemented, the application processor may then execute the additional quality algorithms (step 722). The application processor may then determine if the quality of the measurement is acceptable (step 724) based on comparing the quality to a threshold, and if not, a flag is sent to the receiving unit (step 726), and the measurement is repeated (step 728). If the measurement quality is acceptable, the measurement data is transmitted, and then the system goes to sleep again (step 730).

Figure 8:
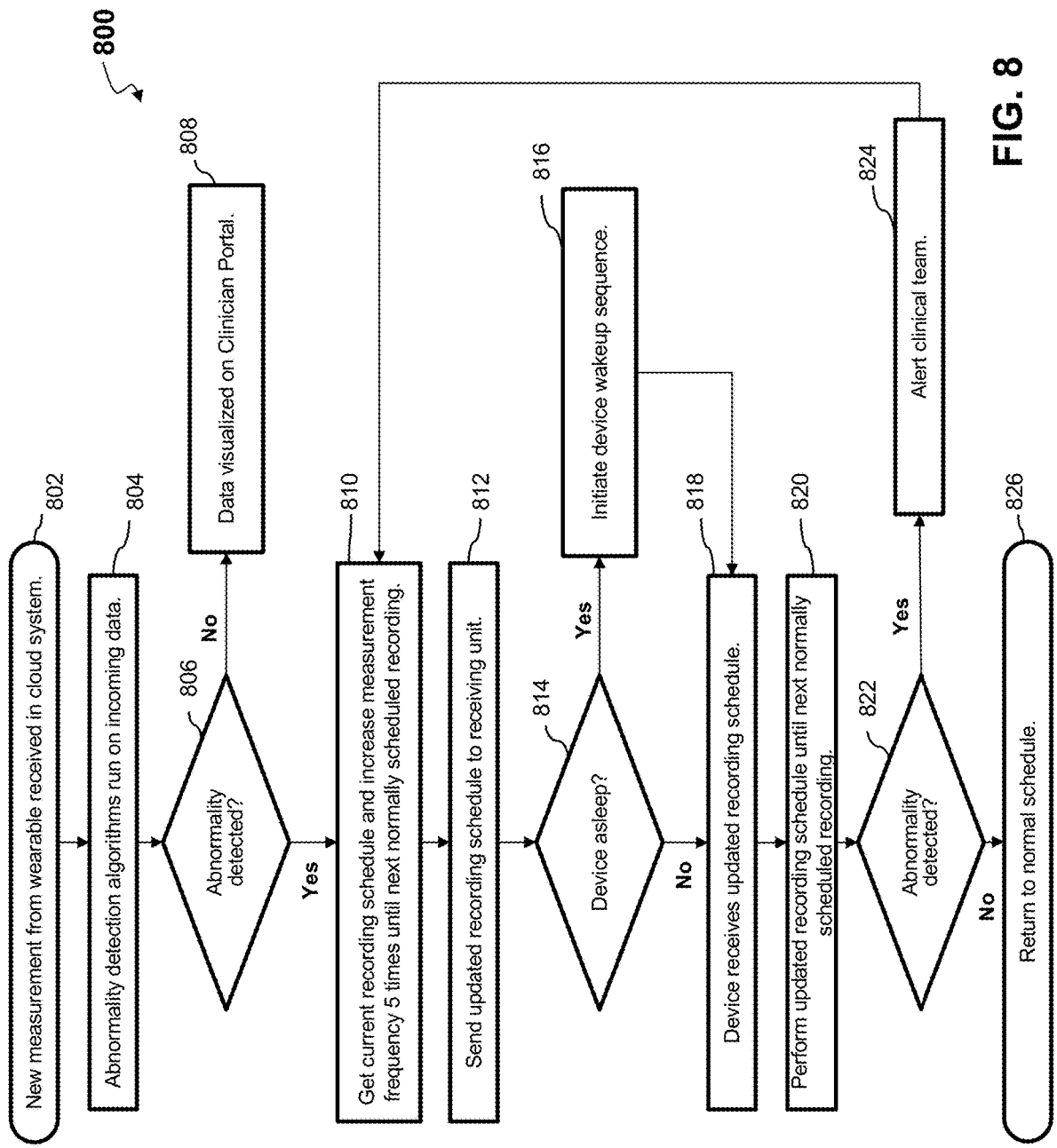
FIG. 8 depicts a flow diagram of a dynamic recording schedule, according to one embodiment.

FIG. 8 depicts a flow diagram of a dynamic recording schedule, according to one embodiment. An additional embodiment of the system discloses the ability to introduce dynamic recording schedules if abnormalities are detected. In this scenario, if, for example, the ECG is set to take recordings every 60 minutes, but abnormalities are detected in the ECG recording by algorithms that are run in the cloud system, the system may notify the wearable device to increase the frequency of recordings for the ECG to, for example, every 10 minutes, while abnormalities are present. This allows for more detailed visibility when there are abnormalities that the clinical team may need to review with a higher level of scrutiny. This type of dynamic adaptation of recordings is not found in prior art or in other existing devices.

Specifically, referring to FIG. 8, the dynamic recording schedule 800, according to one embodiment, may be processed as follows. When a new measurement is received in a server computing system or network computing system (also referred to as the cloud system) from the wearable device (step 802), abnormality detection algorithms may be executed on the incoming data (step 804), and the algorithms determine if an abnormality is detected on the incoming data (step 806). If there is no abnormality detected, the incoming data may be visualized on the clinician portal (step 808). If an abnormality is detected in the incoming data, the current recording schedule is received, and then the measurement frequency is increased by a multiple of the previous frequency, for example, 5 times, until the next normally scheduled recording (step 810). The updated recording schedule may then be transmitted to the receiving unit (step 812). Then, if the wearable device is asleep (step 814), the wearable device wakeup sequence may be initiated (step 816). The awake wearable device may then receive the updated recording schedule from the receiving unit (step 818) and be configured to execute the updated recording schedule until the next normally scheduled recording (step 820). The abnormality detection algorithms may then be continuously executed, to determine if an abnormality is detected (step 822). If there is an abnormality detected, the clinical team may be alerted (step 824). If there is no abnormality, the wearable device may return to the normal schedule (step 826).

Multiple embodiments may be used for dynamic schedule adaptation to adjust the schedule based on the patient's needs. The first instance of the embodiment is a static adaptation which increases the recording frequency by, for example, a standard 10x for an hour or until abnormalities subside, whichever is first. The second instance of the embodiment uses a reinforcement learning (RL) technique, which is a type of machine learning model used to automate decision-making. The abnormality type, disease type, demographic information, and status of the patient are input as states to the model, and the RL model's action output controls the time interval between each recording in the schedule. The RL model may consider aspects such as previous states and trajectories to determine the frequency with which the recordings should be taken and when to return to the standard recording schedule.

The application processor in the wearable device may also be configured to conduct on-board processing of the time series data. Some examples of lightweight analysis algorithms have already been discussed, including oxygen saturation calculation, skin tone calibration, and the assessment of data quality. Additional algorithms may be included and executed, such as shallow neural networks and computational algorithms to extract pulse rate, detect coughing, and classify abnormalities. These individual algorithms may be used to inform the requirements of the application processor to be able to run certain types of analysis. Optionally, the application processor may be configured to interface with a purpose-built secondary neural network accelerator chip onboard the device in order to conduct more complex machine learning classification tasks onboard. The secondary neural accelerator applies neural processing for multiple application types by running deep neural networks (DNNs) natively, including convolutional neural networks, recurrent neural networks, and fully connected networks, thereby creating a flexible architecture in this field.

Embodiments may include the ability to create customizable recording schedules for each of the sensing modalities as well as clinical measures that require combination of modalities, and specifically the dynamic recording schedule that may be implemented when abnormalities are detected. That is, in such embodiments, each sensor or sensing modality is configured to make relevant measurements on an interval that is different from the other sensors. The disclosed embodiments for dynamic schedule adaptation to adjust the schedule based on the patient's needs may be executed on the wearable device, the receiving unit, or a combination of both. That is, the wearable device in some embodiments may be configured to take the measurements, detect abnormalities, dynamically adjust the recording schedule, transmit the adjusted recording schedule to an external device, and internally perform the updated & new recording schedule until the next normally scheduled recording. In this embodiment, the wearable device may inform or transmit the occurrence of the update to the recording schedule to any other device(s) that may be in communication with the wearable device.

The disclosed embodiments provide a set of sensing modalities included on a wearable device (e.g., health patch) and are configured to be taken simultaneously with millisecond-level synchronization. Many features implemented in this system, such as the broad range of sensing modalities and the ability to customize recording schedules, allow for the ability to tailor the wearable device to monitor different types of conditions.

The disclosed embodiments combine all the aforementioned sensing modalities into a lightweight package with continuous monitoring capabilities and configured to implement real-time and dynamic quality control on the wearable device, power management, and a removable battery.

Figure 9:
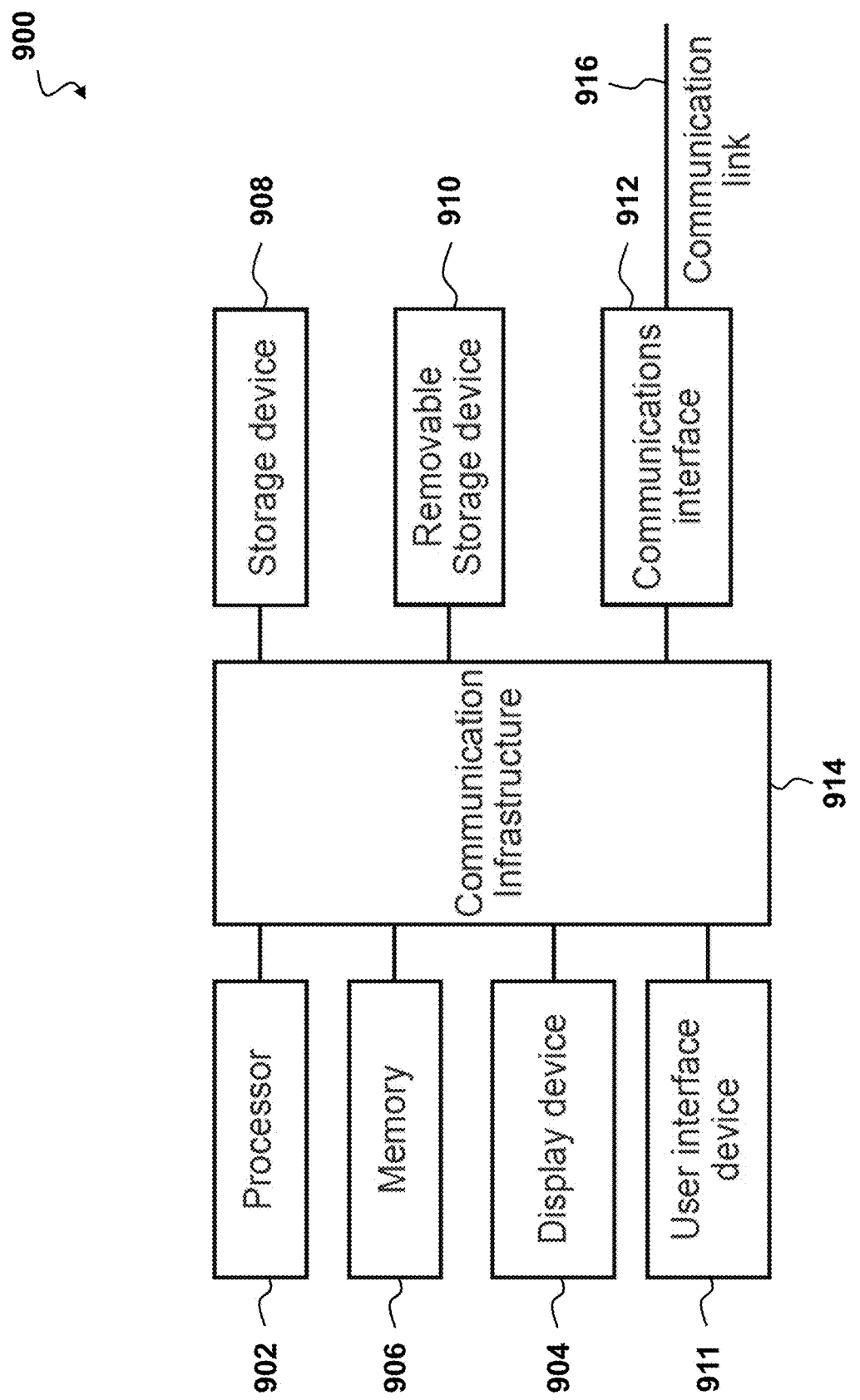
FIG. 9 shows a high-level block diagram and process of a computing system for implementing an embodiment of the system and process.

FIG. 9 is a high-level block diagram 900 showing a computing system comprising a computer system useful for implementing an embodiment of the system and process, disclosed herein. Embodiments of the system may be implemented in different computing environments. The computer system includes one or more processors 902, and can further include an electronic display device 904 (e.g., for displaying graphics, text, and other data), a main memory 906 (e.g., random access memory (RAM)), storage device 908, a removable storage device 910 (e.g., removable storage drive, a removable memory module, a magnetic tape drive, an optical disk drive, a computer-readable medium having stored therein computer software and/or data), a user interface device 911 (e.g., keyboard, touch screen, keypad, pointing device), and a communication interface 912 (e.g., modem, a network interface (such as an Ethernet card), a communications port, or a PCMCIA slot and card). The communication interface 912 allows software and data to be transferred between the computer system and external devices. The system further includes a communications infrastructure 914 (e.g., a communications bus, cross-over bar, or network) to which the aforementioned devices/modules are connected, as shown.

The information transferred via communications infrastructure 914 may be in the form of signals such as electronic, electromagnetic, optical, or other signals capable of being received by communications infrastructure 914, via a communication link 916 that carries signals and may be implemented using wire or cable, fiber optics, a phone line, a cellular/mobile phone link, a radio frequency (RF) link, and/or other communication channels. Computer program instructions representing the block diagram and/or flowcharts herein may be loaded onto a computer, programmable data processing apparatus, or processing devices to cause a series of operations performed thereon to produce a computer-implemented process.

Embodiments have been described with reference to flowchart illustrations and/or block diagrams of methods, apparatus (systems), and computer program products according to embodiments. Each block of such illustrations/diagrams, or combinations thereof, can be implemented by computer program instructions. The computer program instructions, when provided to a processor, produce a machine, such that the instructions, which execute via the processor, create means for implementing the functions/operations specified in the flowchart and/or block diagram. Each block in the flowchart/block diagrams may represent a hardware and/or software module or logic-implementing embodiments. In alternative implementations, the functions noted in the blocks may occur out of the order noted in the figures, concurrently, etc.

Computer programs (i.e., computer control logic) are stored in main memory and/or secondary memory. Computer programs may also be received via a communications interface 912. Such computer programs, when executed, enable the computer system to perform the features of the embodiments as discussed herein. In particular, the computer programs, when executed, enable the processor and/or multi-core processor to perform the features of the computer system. Such computer programs represent controllers of the computer system.

Figure 10:
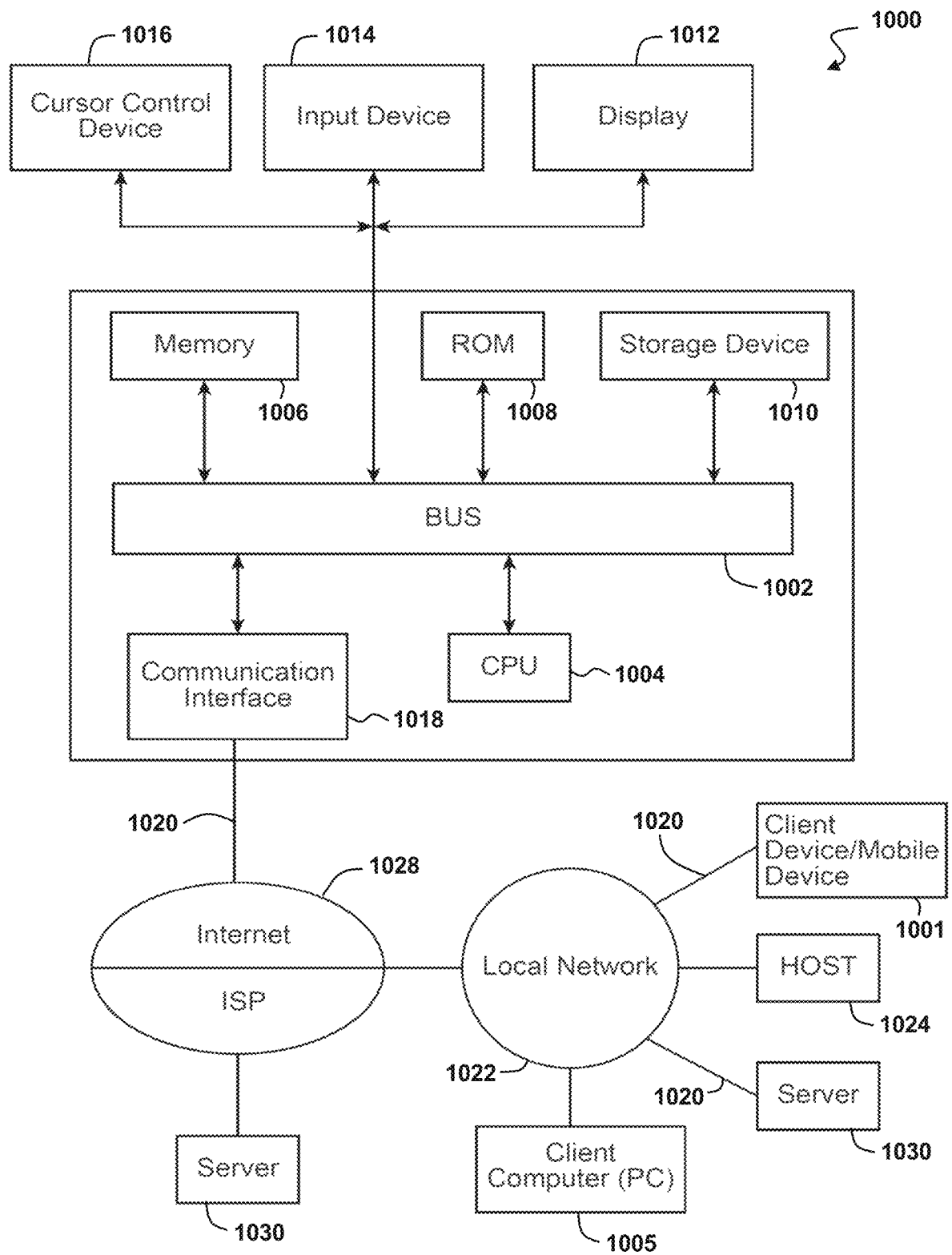
FIG. 10 shows a block diagram and process of an exemplary system in which an embodiment may be implemented.

FIG. 10 shows a block diagram of an example system 1000 in which an embodiment may be implemented. The system 1000 includes one or more client devices 1001 such as consumer electronics devices, connected to one or more server computing systems 1030. A server 1030 includes a bus 1002 or other communication mechanism for communicating information, and a processor (CPU) 1004 coupled with the bus 1002 for processing information. The server 1030 also includes a main memory 1006, such as a random access memory (RAM) or other dynamic storage device, coupled to the bus 1002 for storing information and instructions to be executed by the processor 1004. The main memory 1006 may also be used for storing temporary variables or other intermediate information during execution or instructions to be executed by the processor 1004. The server computer system 1030 further includes a read-only memory (ROM) 1008 or other static storage device coupled to the bus 1002 for storing static information and instructions for the processor 1004. A storage device 1010, such as a magnetic disk or optical disk, is provided and coupled to the bus 1002 for storing information and instructions. The bus 1002 may contain, for example, thirty-two address lines for addressing video memory or main memory 1006. The bus 1002 can also include, for example, a 32-bit data bus for transferring data between and among the components, such as the CPU 1004, the main memory 1006, video memory, and the storage 1010. Alternatively, multiplex data/address lines may be used instead of separate data and address lines.

The server 1030 may be coupled via the bus 1002 to a display 1012 for displaying information to a computer user. An input device 1014, including alphanumeric and other keys, is coupled to the bus 1002 for communicating information and command selections to the processor 1004. Another type of user input device comprises cursor control 1016, such as a mouse, a trackball, or cursor direction keys for communicating direction information and command selections to the processor 1004 and for controlling cursor movement on the display 1012.

According to one embodiment, the functions are performed by the processor 1004 executing one or more sequences of one or more instructions contained in the main memory 1006. Such instructions may be read into the main memory 1006 from another computer-readable medium, such as the storage device 1010. Execution of the sequences of instructions contained in the main memory 1006 causes the processor 1004 to perform the process steps described herein. One or more processors in a multi-processing arrangement may also be employed to execute the sequences of instructions contained in the main memory 1006. In alternative embodiments, hard-wired circuitry may be used in place of or in combination with software instructions to implement the embodiments. Thus, embodiments are not limited to any specific combination of hardware circuitry and software.

The terms "computer program medium," "computer usable medium," "computer-readable medium", and "computer program product," are used to generally refer to media such as main memory, secondary memory, removable storage drive, a hard disk installed in hard disk drive, and signals. These computer program products are means for providing software to the computer system. The computer-readable medium allows the computer system to read data, instructions, messages or message packets, and other computer-readable information from the computer-readable medium. The computer-readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer-readable medium may comprise computer-readable information in a transitory state medium, such as a network link and/or a network interface, including a wired network or a wireless network that allows a computer to read such computer-readable information. Computer programs (also called computer control logic) are stored in main memory and/or secondary memory. Computer programs may also be received via a communications interface. Such computer programs, when executed, enable the computer system to perform the features of the embodiments as discussed herein. In particular, the computer programs, when executed, enable the processor multi-core processor to perform the features of the computer system. Accordingly, such computer programs represent controllers of the computer system.

Generally, the term "computer-readable medium", as used herein, refers to any medium that participated in providing instructions to the processor 1004 for execution. Such a medium may take many forms, including but not limited to, non-volatile media, volatile media, and transmission media. Non-volatile media includes, for example, optical or magnetic disks, such as the storage device 1010. Volatile media includes dynamic memory, such as the main memory 1006. Transmission media includes coaxial cables, copper wire, and fiber optics, including the wires that comprise the bus 1002. Transmission media can also take the form of acoustic or light waves, such as those generated during radio waves and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 1004 for execution. For example, the instructions may initially be carried on a magnetic disk of a remote computer. The remote computer can load the instructions into its dynamic memory and send the instructions over a telephone line using a modem. A modem local to the server 1030 can receive the data on the telephone line and use an infrared transmitter to convert the data to an infrared signal. An infrared detector coupled to the bus 1002 can receive the data carried in the infrared signal and place the data on the bus 1002. The bus 1002 carries the data to the main memory 1006, from which the processor 1004 retrieves and executes the instructions. The instructions received from the main memory 1006 may optionally be stored on the storage device 1010 either before or after execution by the processor 1004.

The server 1030 also includes a communication interface 1018 coupled to the bus 1002. The communication interface 1018 provides a two-way data communication coupling to a network link 1020 that is connected to the worldwide packet data communication network now commonly referred to as the Internet 1028. The Internet 1028 uses electrical, electromagnetic, or optical signals that carry digital data streams. The signals through the various networks and the signals on the network link 1020 and through the communication interface 1018, which carry the digital data to and from the server 1030, are exemplary forms of carrier waves transporting the information.

In another embodiment of the server 1030, interface 1018 is connected to a network 1022 via a communication link 1020. For example, the communication interface 1018 may be an integrated services digital network (ISDN) card or a modem to provide a data communication connection to a corresponding type of telephone line, which can comprise part of the network link 1020. As another example, the communication interface 1018 may be a local area network (LAN) card to provide a data communication connection to a compatible LAN. Wireless links may also be implemented. In any such implementation, the communication interface 1018 sends and receives electrical electromagnetic or optical signals that carry digital data streams representing various types of information.

The network link 1020 typically provides data communication through one or more networks to other data devices. For example, the network link 1020 may provide a connection through the local network 1022 to a host computer 1024 or to data equipment operated by an Internet Service Provider (ISP). The ISP in turn provides data communication services through the Internet 1028. The local network 1022 and the Internet 1028 both use electrical, electromagnetic or optical signals that carry digital data streams. The signals through the various networks and the signals on the network link 1020 and through the communication interface 1018, which carry the digital data to and from the server 1030, are exemplary forms of carrier waves transporting the information.

The server 1030 can send/receive messages and data, including e-mail, program code, through the network, the network link 1020 and the communication interface 1018. Further, the communication interface 1018 can comprise a USB/Tuner and the network link 1020 may be an antenna or cable for connecting the server 1030 to a cable provider, satellite provider or other terrestrial transmission system for receiving messages, data and program code from another source.

The example versions of the embodiments described herein may be implemented as logical operations in a distributed processing system such as the system 1000 including the servers 1030. The logical operations of the embodiments may be implemented as a sequence of steps executing in the server 1030, and as interconnected machine modules within the system 1000. The implementation is a matter of choice and can depend on the performance of the system 1000 implementing the embodiments. As such, the logical operations constituting said example versions of the embodiments are referred to, for e.g., as operations, steps, or modules.

Similar to a server 1030 described above, a client device 1001 can include a processor, memory, storage device, display, input device, and communication interface (e.g., e-mail interface) for connecting the client device to the Internet 1028, the ISP, or LAN 1022, for communication with the servers 1030.

The system 1000 can further include computers (e.g., personal computers, computing nodes) 1005 operating in the same manner as client devices 1001, where a user can utilize one or more computers 1005 to manage data in the server 1030.

Figure 11:
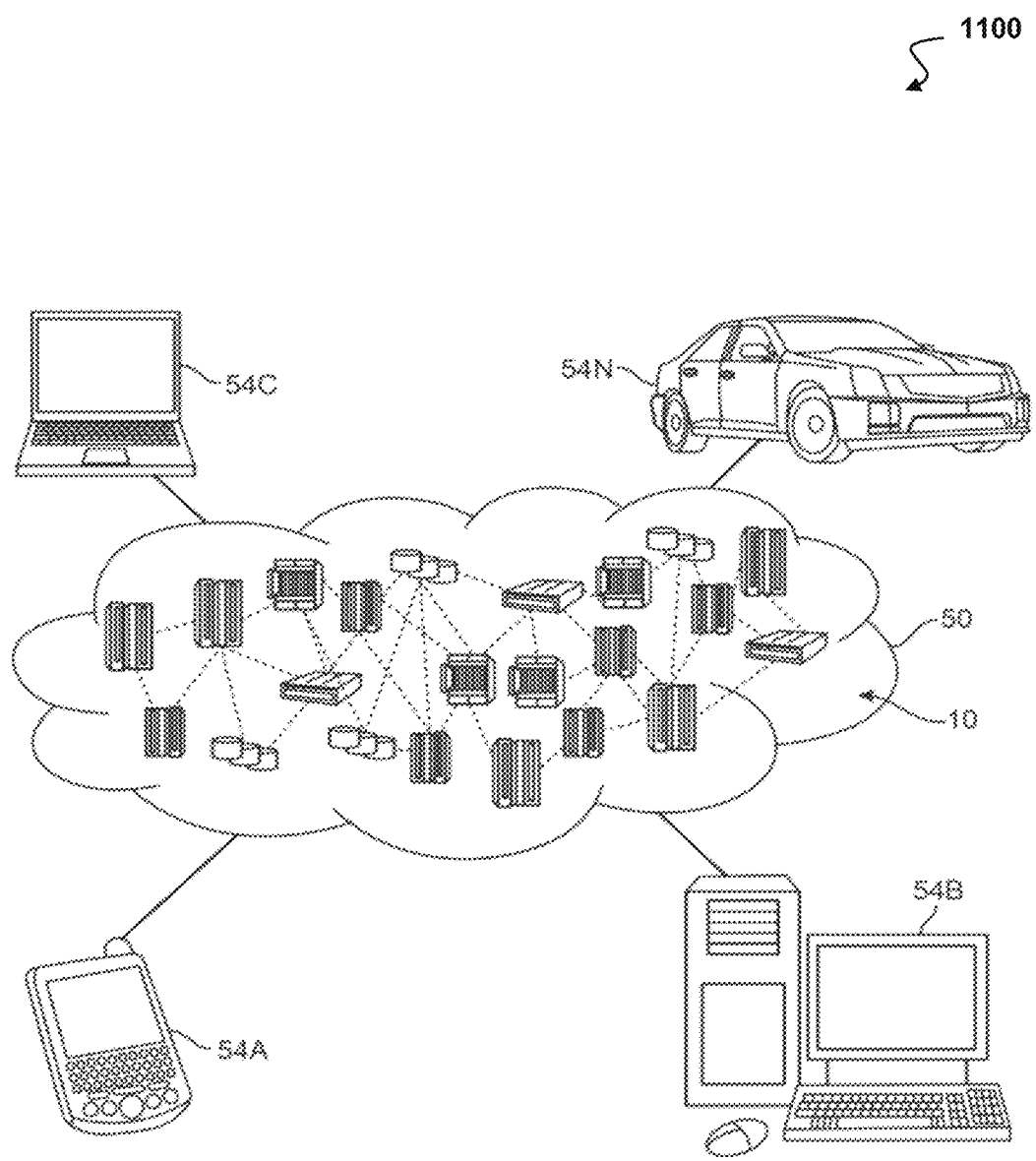
FIG. 11 depicts a cloud computing environment for implementing an embodiment of the system and process disclosed herein.

Referring now to FIG. 11, illustrative computing environment 1100 is depicted. As shown, cloud computing environment 50 comprises one or more cloud computing nodes 10 with which local computing devices used by cloud consumers, such as, for example, personal digital assistant (PDA), smartphone, smartwatch, set-top box, video game system, tablet, mobile computing device, or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
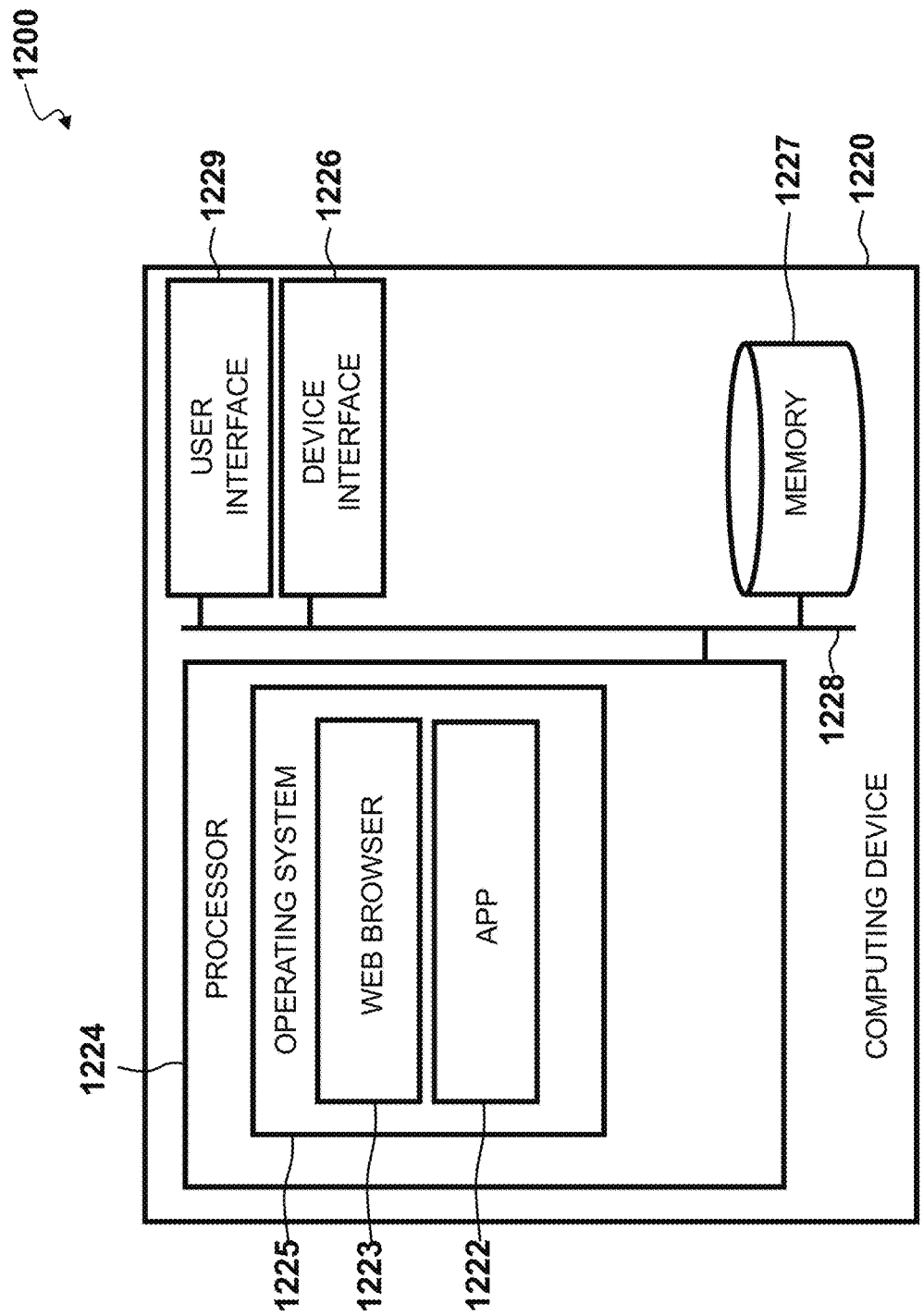
FIG. 12 illustrates an example top-level functional block diagram of a computing device embodiment.

FIG. 12 illustrates an example of a top-level functional block diagram of a computing device embodiment 1200. The example operating environment is shown as a computing device 1220 comprising a processor 1224, such as a central processing unit (CPU), addressable memory 1227, an external device interface 1226, e.g., an optional universal serial bus port and related processing, and/or an Ethernet port and related processing, and an optional user interface 1229, e.g., an array of status lights and one or more toggle switches, and/or a display, and/or a keyboard and/or a pointer-mouse system and/or a touch screen. Optionally, the addressable memory may include any type of computer-readable media that can store data accessible by the computing device 1220, such as magnetic hard and floppy disk drives, optical disk drives, magnetic cassettes, tape drives, flash memory cards, digital video disks (DVDs), Bernoulli cartridges, RAMs, ROMs, smart cards, etc. Indeed, any medium for storing or transmitting computer-readable instructions and data may be employed, including a connection port to or node on a network, such as a LAN, WAN, or the Internet. These elements may be in communication with one another via a data bus 1228. In some embodiments, via an operating system 1225 such as one supporting a web browser 1223 and applications 1222, the processor 1224 may be configured to execute steps of a process establishing a communication channel and processing according to the embodiments described above.

It is contemplated that various combinations and/or subcombinations of the specific features and aspects of the above embodiments may be made and still fall within the scope of the invention. Accordingly, it should be understood that various features and aspects of the disclosed embodiments may be combined with or substituted for one another in order to form varying modes of the disclosed invention. Further, it is intended that the scope of the present invention is herein disclosed by way of examples and should not be limited by the particular disclosed embodiments described above.

What is claimed is:

1. A system comprising:
   a wearable device having a processor and an addressable memory and a plurality of sensors, wherein the plurality of sensors comprises an electrical and biopotential sensor, an optical module, an impedance matched acoustic module, a temperature sensor, and an inertial measurement unit (IMU); and
   a secondary receiving unit having a processor and an addressable memory;
   wherein the wearable device is configured to:
   receive a request from the secondary receiving unit to generate a series of recordings using the plurality of sensors based on a customized recording schedule, wherein the series of recordings is generated via taking a set of measurements;
   detect a current motion associated with a user of the wearable device for generation of the series of recordings based on detecting motion by the IMU configured to measure current motion levels and always be on even while other sensors of the plurality of sensors are asleep;
   delay generation of the series of recordings via taking the set of measurements for a period of time, if the detected current motion is determined to be above a threshold whole measure;
   execute generation of the series of recordings via taking the set of measurements, if the detected current motion is determined to be below the threshold whole measure;
   determine, during the execution of generation of the series of recordings via taking the set of measurements, whether any detected motion is above the threshold whole measure, wherein motion levels are detected and monitored continuously during the taking of the set of measurements;
   extend the recording length by a predetermined period of time above the threshold while motion is being detected to be above the threshold, thereby dynamically adapt recording lengths based on sensor readings and maintain data quality of the recordings;
   transmit, via an established connection to the secondary receiving unit, the generated series of recordings and a flag based on the extension of recording length to indicate one or more sections of a current measurement are tagged as sections of high motion; and
   receive from the secondary receiving unit a new recording schedule based on the flagged transmitted generated series of recordings.

2. The system of claim 1 wherein the secondary receiving unit is configured to:
   perform local processing on the received generated series of recordings and determine a new recording schedule based on the received flag.

3. The system of claim 1 wherein the wearable device is further configured to:
   detect an interruption to the established connection with the secondary receiving unit based on the secondary receiving unit not being present or the connection being lost;
   store the generated series of recordings on the addressable memory of the wearable device in a stack based on the detected interruption; and transmit to the secondary receiving unit at the next connection possibility a set of most recent recordings data first, followed by other measurements in reverse chronological order thereby prioritize the most recent recordings information that describes the current status of the patient.

4. The system of claim 3 wherein the wearable device is further configured to:
assign, via the stacking procedure, a priority to each recording of the generated series of recordings, wherein the most recent recording is assigned the highest priority and then descending priority by time stamp.

5. The system of claim 4 wherein the wearable device is further configured to:
detect abnormalities in the recording via on-board algorithms; and
assign the highest priority to a recording of the generated series of recordings regardless of timestamp based on the detected abnormalities.

6. The system of claim 5 wherein recordings with abnormalities are not replaced by normal recordings if abnormalities are detected via the on-board algorithms.

7. The system of claim 5 wherein the wearable device is further configured to:
adjust recording frequency based on whether any abnormal recording has been detected.

8. The system of claim 7 wherein the wearable device is further configured to:
increase the recording frequency by a standard multiplier factor for a period of time or until abnormalities subside, whichever is first.

9. The system of claim 1, wherein the plurality of sensors further comprises: sensing modalities of at least one of: impedance-matched auscultation, electrocardiography (ECG), pulse oximetry via photoplethysmography (PPG), bioimpedance (BioZ), skin temperature, and motion and tilt.

10. The system of claim 9 wherein each sensor the plurality of sensors is configured to make relevant measurements on an interval that is different from the other sensors.

11. A device having a processor and an addressable memory comprising:
a plurality of sensors, wherein the plurality of sensors comprises an electrical and biopotential sensor, an optical module, an impedance matched acoustic module, a temperature sensor, and an inertial measurement unit (IMU); and wherein the device is configured to:
receive a request to generate a series of recordings using the plurality of sensors based on a customized recording schedule, wherein the series of recordings is generated via taking a set of measurements;
detect a current motion associated with a user of the device for generation of the series of recordings based on detecting motion by the IMU configured to measure current motion levels and always be on even while other sensors of the plurality of sensors are asleep;
delay generation of the series of recordings for a period of time, if the detected current motion is determined to be above a threshold whole measure;
execute generation of the series of recordings, if the detected current motion is determined to be below the threshold whole measure;
determine, during the execution of generation of the series of recordings, whether any detected motion is above the threshold whole measure, wherein motion levels are detected and monitored continuously during the taking of the set of measurements;
extend the recording length by a predetermined period of time above the threshold while motion is being detected to be above the threshold, thereby dynamically adapt recording lengths based on sensor readings and maintain data quality of the recordings;
transmit the generated series of recordings and a flag based on the extension of recording length to indicate one or more sections of a current measurement are tagged as sections of high motion; and
determine a new recording schedule based on the flagged transmitted generated series of recordings and dynamically adapted recording lengths.

12. The device of claim 11 wherein the device is further configured to:
assign a priority to each recording of the generated series of recordings, wherein the most recent recording is assigned the highest priority and then descending priority by time stamp;
detect abnormalities in the recording via on-board algorithms;
assign the highest priority to a recording of the generated series of recordings regardless of timestamp based on the detected abnormalities, wherein recordings with abnormalities are not replaced by normal recordings if abnormalities are detected via the on-board algorithms; and
adjust recording frequency based on whether any abnormal recording has been detected.

13. A method comprising:
receiving by a wearable device having a processor and an addressable memory a request from a secondary receiving unit having a processor and an addressable memory to generate a series of recordings using a plurality of sensors based on a customized recording schedule, wherein the series of recordings is generated via taking a set of measurements;
detecting a current motion associated with a user of the wearable device for generation of the series of recordings based on detecting current motion levels;
delaying generation of the series of recordings for a period of time, if the detected current motion is determined to be above a threshold whole measure;
executing generation of the series of recordings if the detected current motion is determined to be below the threshold whole measure;
determining, during the execution of generation of the series of recordings whether any detected motion is above the threshold whole measure, wherein motion levels are detected and monitored continuously during the taking of the set of measurements;
extending the recording length by a predetermined period of time above the threshold while motion is being detected to be above the threshold, thereby dynamically adapt recording lengths based on sensor readings and maintain data quality of the recordings;
assigning a priority to each recording of the generated series of recordings, wherein the most recent recording is assigned the highest priority and then descending priority by time stamp;
detecting abnormalities in the recording by the wearable device;
assigning the highest priority to a recording of the generated series of recordings regardless of timestamp based on the detected abnormalities, wherein recordings with abnormalities are not replaced by normal recordings;

adjusting recording frequency based on whether any abnormal recording has been detected;

transmitting, to the secondary receiving unit, the generated series of recordings and a flag based on the extension of recording length to indicate one or more sections of a current measurement are tagged as sections of high motion; and receiving from the secondary receiving unit a new recording schedule based on the flagged transmitted generated series of recordings.

14. The method of claim 13 further comprising:

detecting an interruption to the established connection with the secondary receiving unit based on the secondary receiving unit not being present or the connection being lost;

storing the generated series of recordings on the addressable memory of the wearable device in a stack based on the detected interruption; and transmitting to the secondary receiving unit at the next connection possibility a set of most recent recordings data first, followed by other measurements in reverse chronological order thereby prioritize the most recent recordings information that describes the current status of the patient.

15. The method of claim 13 wherein the wearable device comprises a plurality of sensors including: an electrical and biopotential sensor, an optical module, an impedance matched acoustic module, a temperature sensor, and an inertial measurement unit (IMU).

* * * * *